US012786829B2

(12) United States Patent
Chang

(10) Patent No.: US 12,786,829 B2
(45) Date of Patent: Nov. 3, 2026

(54) HANDOVER METHOD AND APPARATUS FOR MULTIPLE TRANSMISSION AND RECEPTION POINTS

(71) Applicant: ELECTRONICS AND TELECOMMUNICATIONS RESEARCH INSTITUTE, Daejeon (KR)

(72) Inventor: Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 286 days.

(21) Appl. No.: 18/537,383

(22) Filed: Dec. 12, 2023

(65) Prior Publication Data

US 2024/0196291 A1 Jun. 13, 2024

(30) Foreign Application Priority Data

Dec. 13, 2022 (KR) ........................ 10-2022-0173684
Dec. 11, 2023 (KR) ........................ 10-2023-0179052

(51) Int. Cl.
*H04W 36/08* (2009.01)
*H04W 36/00* (2009.01)

(52) U.S. Cl.
CPC ....... *H04W 36/08* (2013.01); *H04W 36/0061* (2013.01)

(58) Field of Classification Search
CPC ......... H04W 36/0058; H04W 36/0061; H04W 36/0072; H04W 36/08; H04W 36/085; H04W 36/087
See application file for complete search history.

(56) References Cited

U.S. PATENT DOCUMENTS 11,924,696 B2 * 3/2024 Talukdar ........... H04W 36/0055
2013/0122918 A1 * 5/2013 Boley ................... H04W 76/27 455/450
2018/0027540 A1 * 1/2018 Guo ................... H04B 7/06952 370/329
2020/0077466 A1 * 3/2020 Liu ....................... H04W 28/04
2021/0135801 A1 * 5/2021 Zhou ................. H04W 72/0453
2022/0086936 A1 3/2022 Akl et al.
2022/0232655 A1 7/2022 Noh et al.
2022/0263797 A1 8/2022 Liu et al.
2022/0408324 A1 12/2022 Akl et al.
(Continued)

FOREIGN PATENT DOCUMENTS

KR 10-2023-0017589 A 2/2023

*Primary Examiner* — Kashif Siddiqui

(57) ABSTRACT

A handover method of a terminal may comprise: performing a procedure to search for neighbor TRPs including a target TRP; transmitting a neighbor TRP information report message including information on searched neighbor TRPs to a current serving TRP; receiving, from a DU to which the terminal is connected and through the current serving TRP, a command indicating TRP switching for switching a serving TRP of the terminal from the current serving TRP to the target TRP; and performing an access procedure to the target TRP according to the command indicating the TRP switching, wherein the TRP switching is determined based on the neighbor TRP information report message.

15 Claims, 16 Drawing Sheets

(56) References Cited

U.S. PATENT DOCUMENTS

| | | | | |
|---|---|---|---|---|
| 2023/0034163 | A1 | 2/2023 | Kim | |
| 2023/0126621 | A1 | 4/2023 | You et al. | |
| 2023/0127876 | A1* | 4/2023 | Chang | H04W 36/087 370/329 |
| 2023/0345318 | A1* | 10/2023 | Kim | H04W 36/0085 |
| 2024/0114403 | A1* | 4/2024 | Latheef | H04W 36/0061 |
| 2024/0147315 | A1* | 5/2024 | Park | H04W 36/0058 |
| 2024/0162956 | A1* | 5/2024 | Goyal | H04B 7/0632 |
| 2024/0306026 | A1* | 9/2024 | Masri | H04W 24/10 |
| 2025/0071639 | A1* | 2/2025 | Hong | H04W 36/00835 |
| 2025/0212068 | A1* | 6/2025 | Gu | H04W 16/28 |
| 2025/0374137 | A1* | 12/2025 | Wallentin | H04W 36/0005 |

* cited by examiner

100

(a) direct type (b) relay type (c) inter-gNB type

HANDOVER METHOD AND APPARATUS FOR MULTIPLE TRANSMISSION AND RECEPTION POINTS

CROSS-REFERENCE TO RELATED APPLICATIONS

This application claims priority to Korean Patent Applications No. 10-2022-0173684, filed on Dec. 13, 2022, and No. 10-2023-0179052, filed on Dec. 11, 2023, with the Korean Intellectual Property Office (KIPO), the entire contents of which are hereby incorporated by reference.

BACKGROUND

1. Technical Field

Exemplary embodiments of the present disclosure relate to a handover technique, and more specifically, to a method and an apparatus for implementing a borderless cell by overcoming performance degradation of radio signals in a boundary of cells and/or transmission reception points (TRPs) under a multi-TRP environment, and a method and an apparatus for operating radio interfaces and distributed unit (DU) interfaces therefor.

2. Related Art

In a mobile communication system, a base station connected to a network can provide a radio connection to a terminal moving within a predetermined coverage. The terminal can be bidirectionally connected to the network through a process of bidirectionally exchanging data with the connected base station. The moving terminal can maintain connection with the network by changing a connected base station in a handover scheme. The base station may play a role of proactively managing resources within a coverage providing a connection to the terminal. The terminal managed by the base station can exchange data with the base station through a process of transmitting and receiving radio signals using allocated resources.

The base station may be configured variously according to the size of its coverage providing connectivity. Base stations providing various coverages may be overlapped and provide radio accesses to terminals. In general, the size of the coverage provided by the base station depends on a frequency, and decreases as the frequency increases. A plurality of transmission and reception points (TRPs) are devices that transmit and receive radio signals to and from a terminal, constitute a part of the base station, and may constitute the base station at the same location or distributed locations. The base station may be configured in a centralized manner for radio access functions or in a distributed manner for the functions. The base station whose radio access functions are distributed may be configured with a central unit (CU) providing upper functions and at least one distributed unit (DU) providing lower functions.

SUMMARY

Exemplary embodiments of the present disclosure are directed to providing a method and an apparatus for handover of a terminal in an environment where multiple TRPs are used.

Exemplary embodiments of the present disclosure are also directed to providing a method and an apparatus for handover of a terminal with respect to a dual access TRP.

According to a first exemplary embodiment of the present disclosure, a handover method of a terminal may comprise: performing a procedure to search for neighbor transmission and reception points (TRPs) including a target TRP; transmitting a neighbor TRP information report message including information on searched neighbor TRPs to a current serving TRP; receiving, from a distributed unit (DU) to which the terminal is connected and through the current serving TRP, a command indicating TRP switching for switching a serving TRP of the terminal from the current serving TRP to the target TRP; and performing an access procedure to the target TRP according to the command indicating the TRP switching, wherein the TRP switching is determined based on the neighbor TRP information report message.

The current serving TRP and the target TRP may be TRPs commonly connected to the DU.

The neighbor TRP information report message may include a beam identifier of the target TRP.

The handover method may further comprise: transmitting a TRP switching complete message to the DU; and receiving a TRP switching acknowledgment message from the DU.

According to a second exemplary embodiment of the present disclosure, a handover method of a terminal may comprise: detecting a beam change within a dual access transmission and reception point (TRP) through a beam search procedure; reporting a beam search result indicating the beam change to a current serving distributed unit (DU) through the dual access TRP; receiving, from a central unit (CU) to which the terminal is connected and through the dual access TRP, a command message indicating DU switching for switching a serving TRP of the terminal from the current serving DU to a target DU; and performing an access procedure to the target DU.

The DU switching may be determined and notified by the current serving DU to the CU, or determined by the CU based on a beam search result from the terminal.

The current serving DU may be a master DU connected to the dual access TRP and the target DU may be a secondary DU connected to the dual access TRP, or the current serving DU may be a secondary DU connected to the dual access TRP and the target DU may be a master DU connected to the dual access TRP.

Radio resources managed by the current serving DU may be mutually exclusive from radio resources managed by the target DU.

The command message indicating the DU switching may be a radio resource control (RRC) reconfiguration message.

The command message indicating the DU switching may be transmitted through radio resources managed by the current serving DU.

The access procedure to the target DU may be performed through radio resources managed by the target DU.

The handover method may further comprise: transmitting a DU switching complete message to the CU; and receiving, from the CU, an acknowledgment message for the DU switching complete message transmitted by the terminal.

The DU switching complete message and the acknowledgement message may be transmitted and received through radio resources managed by the current serving DU, the DU switching complete message may be an RRC reconfiguration complete message, and the acknowledgement message may be a radio link control (RLC) acknowledgement (ACK) message.

The handover method may further comprise: receiving, from the dual access TRP, a synchronization signal/physical broadcast channel (SS/PBCH) of the CU, system information block (SIB) associated with the current serving DU, and SIB associated with the target DU.

According to a third exemplary embodiment of the present disclosure, a method of a terminal may comprise: receiving a master information block (MIB) from a master distributed unit (DU) connected to a first transmission and reception point (TRP) through the first TRP; and receiving, through the first TRP, a first system information block (SIB) of the master DU and a second SIB of a first secondary DU connected to the first TRP, wherein the master DU and at least one secondary DU including the first secondary DU belong to a same central unit (CU) or different CUs, and different radio resources are allocated to the master CU and the first secondary DU.

The MIB may include information on resources for reception of the first SIB and may be received through radio resources allocated to the master DU.

The first SIB may include information related to reception of the second SIB.

The first SIB may include information on resources for reception of the second SIB.

At least a portion of the second SIB may be received as being included in the first SIB.

Common information of the first SIB and the second SIB may be received through resources allocated to the master DU, and information on a difference between the first SIB and the second SIB may be received through resources allocated to the first secondary DU.

Exemplary embodiments of the present disclosure can provide a method for transmitting SS/PBCHs and SIBs of a dual access TRP and an initial access procedure for the dual access TRP. In addition, exemplary embodiments of the present disclosure can provide a TRP switching method and a DU switching method for a terminal in a communication system in which multiple TRPs exist and in a communication system in which a dual access TRP exists. Therefore, according to the exemplary embodiments of the present disclosure as described above, the mobility of the terminal can be efficiently supported in the communication system in which multiple TRPs exist and the communication system in which a dual access TRP exists.

DETAILED DESCRIPTION OF THE EMBODIMENTS

Figure 1:
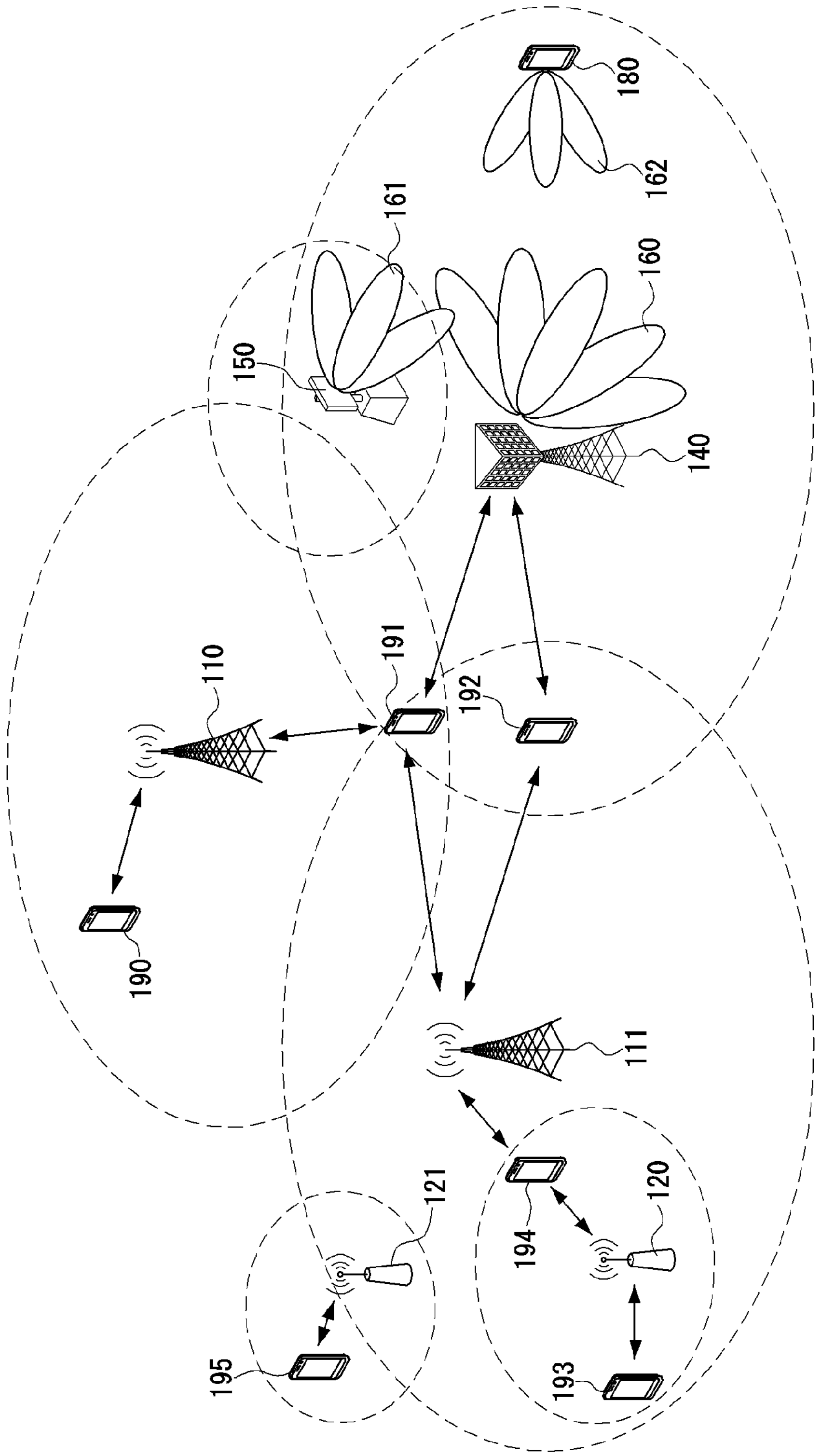
FIG. 1 is a conceptual diagram illustrating an exemplary embodiment of a mobile communication network to which exemplary embodiments of the present invention are applied.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B".

Also, in exemplary embodiments of the present disclosure, “one or more of A and B” may mean “one or more of A or B” or “one or more of combinations of one or more of A and B”.

It will be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (i.e., “between” versus “directly between,” “adjacent” versus “directly adjacent,” etc.).

The terminology used herein is for the purpose of describing particular embodiments only and is not intended to be limiting of the present disclosure. As used herein, the singular forms “a,” “an” and “the” are intended to include the plural forms as well, unless the context clearly indicates otherwise. It will be further understood that the terms “comprises,” “comprising,” “includes” and/or “including,” when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), the sixth generation (6G) communication system, or the like. The 4G communication system may support communications in a frequency band of 6 GHz or below, and the 5G communication system may support communications in a frequency band of 6 GHz or above as well as the frequency band of 6 GHz or below. The communication network may include a terrestrial network and a non-terrestrial network. The communication system to which the exemplary embodiments according to the present disclosure are applied is not limited to the contents described below, and the exemplary embodiments according to the present disclosure may be applied to various communication systems. Here, the communication system may be used in the same sense as a communication network, ‘LTE’ may refer to ‘4G communication system’, ‘LTE communication system’, or ‘LTE-A communication system’, and ‘NR’ may refer to ‘5G communication system’ or ‘NR communication system’.

In exemplary embodiments, “an operation (e.g., transmission operation) is configured” may mean that “configuration information (e.g., information element(s) or parameter(s)) for the operation and/or information indicating to perform the operation is signaled”. “Information element(s) (e.g., parameter(s)) are configured” may mean that “corresponding information element(s) are signaled”. In other words, “an operation (e.g., transmission operation) is configured in a communication node” may mean that the communication node receives “configuration information (e.g., information elements, parameters) for the operation” and/or “information indicating to perform the operation”. “An information element (e.g. parameter) is configured in a communication node” may mean that “the information element is signaled to the communication node (e.g. the communication node receives the information element)”.

The signaling may be at least one of system information (SI) signaling (e.g., transmission of system information block (SIB) and/or master information block (MIB)), RRC signaling (e.g., transmission of RRC parameters and/or higher layer parameters), MAC control element (CE) signaling, or PHY signaling (e.g., transmission of downlink control information (DCI), uplink control information (UCI), and/or sidelink control information (SCI)). A signaling message may be at least one of an SI signaling message (e.g., SI message), an RRC signaling message (e.g., RRC message), a MAC CE signaling message (e.g., MAC CE message or MAC message), or a PHY signaling message (e.g., PHY message).

In a mobile communication system, a base station connected to a network can provide a radio connection to a terminal moving within a predetermined coverage. The terminal can be bidirectionally connected to the network through a process of bidirectionally exchanging data with the connected base station. The moving terminal can maintain connection with the network by changing a connected base station in a handover scheme. The base station may play a role of proactively managing resources within a coverage providing a connection to the terminal. The terminal managed by the base station can exchange data with the base station through a process of transmitting and receiving radio signals using allocated resources.

The base station may be configured variously according to the size of its coverage providing connectivity. Base stations providing various coverages may be overlapped and provide radio accesses to terminals. In general, the size of the coverage provided by the base station depends on a frequency, and decreases as the frequency increases. A plurality of transmission and reception points (TRPs) are devices that transmit and receive radio signals to and from a terminal, constitute a part of the base station, and may constitute the base station at the same location or distributed locations. The base station may be configured in a centralized manner for radio access functions or in a distributed manner for the functions. The base station whose radio access functions are distributed may be configured with a central unit (CU) providing upper functions and at least one distributed unit (DU) providing lower functions.

The terminal may transmit and receive radio signals with cell(s) provided by the base station in a radio section, and transmit and receive data using a hierarchical radio access protocol that performs radio access functions. A service packet generated in a service layer may be delivered to a counterpart through the radio access protocol. The base station may distribute the radio access protocol to distributed devices in functional units, and may be configured as a set of the distributed devices. The radio access function provided by the radio access protocol generally uses a single frequency band, and may be performed in a bandwidth part (BWP) within the frequency band. A method of using multiple frequency bands may be classified into carrier aggregation (CA) and dual connectivity (DC) according to a configuration scheme of the radio access protocol.

As a method of using a frequency in a terahertz band, a multi-transmission and reception point (Multi-TRP) technique may be used. One TRP may configure a short service radius for radio communication with a terminal. A moving terminal has a phenomenon in which a quality of radio signals is lowered because the signals rapidly decrease at a boundary of the TRP. Therefore, a method for allowing a terminal to receive radio signals with high quality at the TRP boundary is required.

1. Wireless Communication Network 1.1. Wireless Communication Network

A wireless communication network to which exemplary embodiments according to the present disclosure are applied will be described. A wireless communication network to which exemplary embodiments according to the present disclosure are applied is not limited to the contents described below, and exemplary embodiments according to the present disclosure may be applied to various wireless communication networks. Here, the wireless communication network may be used as the same meaning as a wireless communication system.

FIG. 1 is a conceptual diagram illustrating an exemplary embodiment of a mobile communication network to which exemplary embodiments of the present invention are applied.

Referring to FIG. 1, a mobile communication network 100 may comprise a plurality of communication nodes 110, 111, 120, 121, 140, 150, 180, 190, 191, 192, 193, 194, and 195. Each of the plurality of communication nodes may support at least one communication protocol. For example, each of the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a space division multiple access (SDMA) based communication protocol, or the like.

The mobile communication network 100 may comprise a plurality of base stations (BSs) 110, 111, 120, 121, 140, and 150, and a plurality of terminals (user equipments (UEs)) 190, 191, 192, 193, 194, 195, and 180. Each of the plurality of base stations 110, 111, and 140 may form a macro cell. Alternatively, each of the plurality of base stations 120, 121, and 150 may form a small cell. The plurality of base station 190 and 191 may belong to a cell coverage of the base station 110. The plurality of base stations 120 and 121 and the plurality of terminals 191, 192, 193, 194, and 195 may belong to a cell coverage of the base station 111. The base station 150 and the plurality of terminals 191, 192, and 180 may belong to a cell coverage of the base station 140.

Each of the plurality of communication nodes 110, 111, 120, 121, 140, 150, 180, 190, 191, 192, 193, 194, and 195 may support a radio access protocol specification of a radio access technology based on cellular communication (e.g., long term evolution (LTE), LTE-Advanced (LTE-A), new radio (NR), etc. which are defined in the 3rd generation partnership project (3GPP) standard). Each of the plurality of base stations 110, 111, 120, 121, 140, and 150 may operate in a different frequency band, or may operate in the same frequency band. The plurality of base stations 110, 111, 120, 121, 140, and 150 may be connected to each other through an ideal backhaul or a non-ideal backhaul, and may exchange information with each other through the ideal backhaul or the non-ideal backhaul. Each of the plurality of base stations 110, 111, 120, 121, 140, and 150 may be connected to a core network (not shown) through a backhaul. Each of the plurality of base stations 110, 111, 120, 121, 140, and 150 may transmit data received from the core network to the corresponding terminals 190, 191, 192, 193, 194, 195, and 180, and transmit data received from the corresponding terminals 190, 191, 192, 193, 194, 195, and 180 to the core network.

Each of the plurality of communication nodes 110, 111, 120, 121, 140, 150, 180, 190, 191, 192, 193, 194, and 195 constituting the mobile communication network 100 may exchange signals with a counterpart communication node without interferences by using a beam formed through a beamforming function using multiple antennas.

Each of the plurality of base stations 110, 111, 120, 121, 140, and 150 may support multiple input multiple output (MIMO) transmissions using multiple antennas (e.g., single user (SU)-MIMO, multi user (MU)-MIMO, massive MIMO, etc.), coordinated multipoint (CoMP) transmission, carrier aggregation (CA) transmission, unlicensed band transmission, device-to-device (D2D) communication, proximity services (ProSe), dual connectivity transmission, and the like.

Each of the plurality of base stations 110, 111, 120, 121, 140, and 150 may be referred to as a NodeB, evolved NodeB, gNB, ng-eNB, radio base station, access point, access node, node, radio side unit (RSU), or the like. Each of the plurality of terminals 190, 191, 192, 193, 194, 195, and 180 may be referred to as a user equipment (UE), terminal, access terminal, mobile terminal, station, subscriber station, mobile station, portable subscriber station, node, device, Internet of Things (IOT) device, mounted apparatus (e.g., mounted module/device/terminal or on-board device/terminal, etc.), or the like. The content of the present invention is not limited to the above-mentioned terms, and they may be replaced with other terms that perform the corresponding functions according to a radio access protocol according to a radio access technology (RAT) and a functional configuration supporting the same.

1.2. Communication Node

Figure 2:
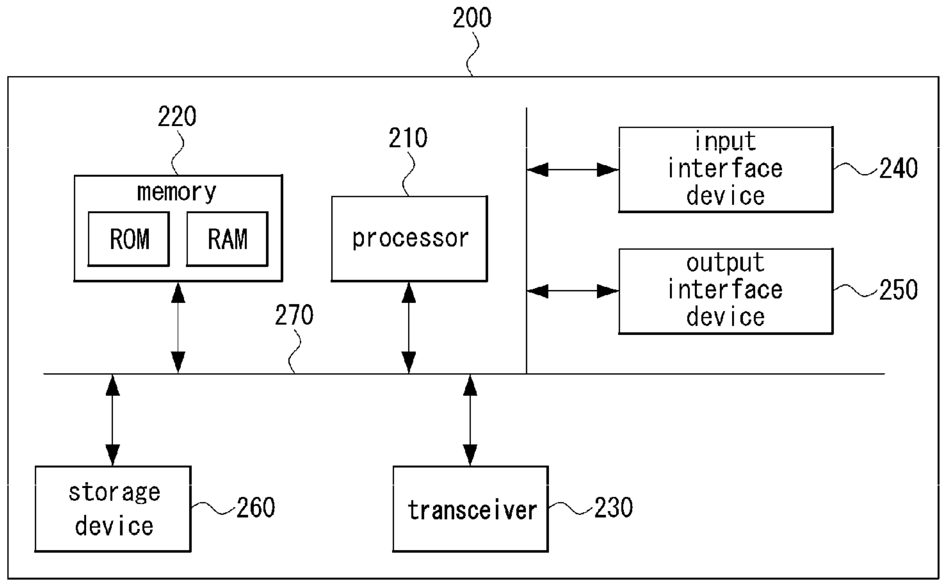
FIG. 2 is a block diagram illustrating an exemplary embodiment of a communication node constituting a mobile communication network.

FIG. 2 is a block diagram illustrating an exemplary embodiment of a communication node constituting a mobile communication network.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with exemplary embodiments of the present invention are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Each of the plurality of communication nodes 110, 111, 120, 121, 140, 150, 180, 190, 191, 192, 193, 194, and 195 constituting the mobile communication network 100 may be implemented in the form of the communication node 200.

1.3. Base Station Having a Distributed Structure

Figure 3:
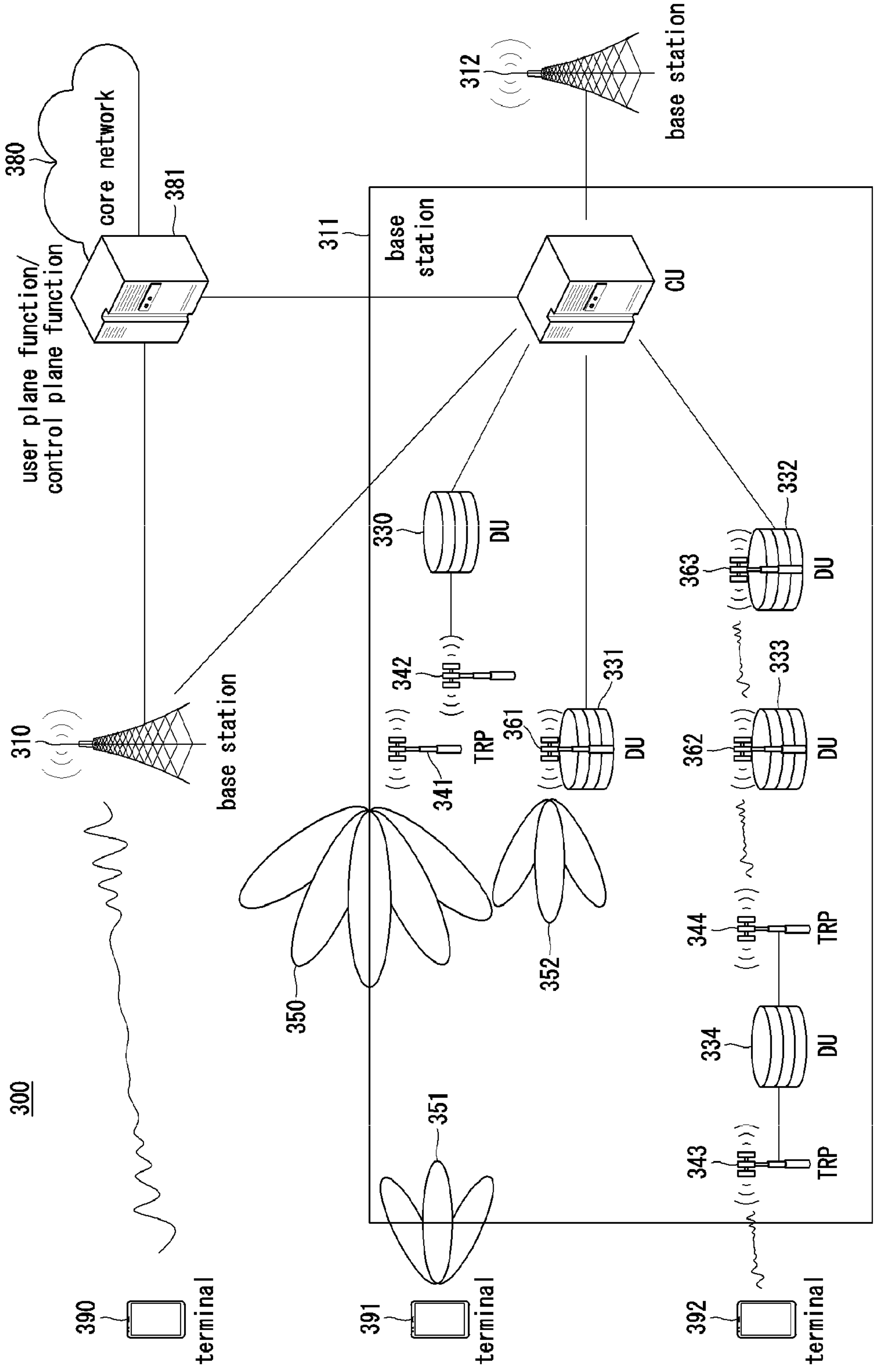
FIG. 3 is a diagram illustrating connection between a base station and a core network in a wireless communication network using a base station having a distributed structure to which the present disclosure is applicable.

FIG. 3 is a diagram illustrating connection between a base station and a core network in a wireless communication network using a base station having a distributed structure to which the present disclosure is applicable.

Referring to FIG. 3, in a wireless communication network 300 including a core network 380, base stations 310, 311, and 312 may be connected to an end node 381 of the core network 380 through a backhaul.

In addition, the base stations 310, 311, and 312 may transfer data exchanged between the plurality of terminals 390, 391, and 392 and the core network 380 in both directions, that is, from the plurality of terminals 390, 391, and 392 to the core network 380 and from the core network 380 to the plurality of terminals 390, 391, and 392.

The core network 380 illustrated in FIG. 3 may correspond to a 4G core network supporting 4G communication or a 5G core network supporting 5G communication. Here, the core network 380 supporting 4G communication may include a mobility management entity (MME), a serving-gateway (S-GW), a packet data network (PDN)-gateway (P-GW), and the like. The core network 380 supporting 5G communication may include an access and mobility management function (AMF) entity, a user plane function (UPF) entity, a P-GW, and the like.

Here, the end node 381 of the core network 380 may provide a user plane function for exchanging packets composed of service data with the plurality of terminals 390, 391, and 392 and a control plane function for managing access and mobility of the terminals.

The user plane function of the end node 381 may be a serving-gateway (S-GW) in the case of 4G system, a user plane function (UPF) in the case of 5G system, or a network entity that transmits specific service data (i.e., user data) to the plurality of terminals 390, 391, and 392 in the corresponding system in the case of other systems.

The control plane function of the end node 381 may be an MME in the case of 4G system, an AMF function in the case of 5G system, or a network entity for mobility management and/or session management of the plurality of terminals 390, 391, and 392 in the corresponding system in the case of other systems.

In the present disclosure, the terms 'S-GW', 'UPF', 'MME', and 'AMF' used in the 4G network and/or 5G network are described as examples for better understanding. However, the present disclosure is not limited to such the 4G network and/or 5G network, and the terms may be replaced with other terms indicating the corresponding functions according to a radio access protocol of a radio access technology (RAT) or entities performing the corresponding functions according to constituent functions of the core network.

The base station 311 composed of a set of distributed devices configured by splitting the functions of the radio access protocol may include a central unit (CU) 320 with a centralized function, a plurality of distributed units (DUs) 330, 331, 332, 333, and 334 with distributed functions, and a plurality of transmission and reception points (TRPs) 340, 341, and 342 for transmitting and receiving signals. In FIG. 3, only the base station 311 is shown as a base station having a distributed structure, but the other base stations 310 and 312 may also be configured identically or similarly to the base station 311 having a distributed structure.

The CU 320, which includes upper functions of the radio access protocol, may be connected to the plurality of DUs 330, 331, 332, 333, and 334 in the direction of a radio section, and may be connected to the end node 381 in the direction of the core network 380. In addition, the CU 320 may be connected to the plurality of neighboring base stations 310 and 312.

Each of the plurality of DUs 330, 331, 332, 333, and 334 which include lower functions of the radio access protocol may be connected to the plurality of TRPs 351, 352, and 353 located at the same geographical location, and each of the plurality of DUs 330 and 334 may be connected to the plurality of TRPs 341, 342, 343, and 344 located at remote locations.

Each of the plurality of base stations 310, 311, and 312 may include a plurality of TRPs for transmitting and receiving radio signals. Each of the TRPs may transmit signals to at least one terminal 390, 391, or 392 and may receive signals from the at least one terminal 390, 391, or 392. Each of the TRPs may provide signals from the at least one of the terminals 390, 391, or 392 to the CU through a DU connected thereto.

Each of the plurality of TRPs 341, 342, 343, 344, 361, 362, and 363 may operate independently or in cooperation with neighboring TRPs. The operation of the plurality of TRPs 341, 342, 343, 344, 361, 362, and 363 will be further described with reference to other drawings.

In addition, each of the plurality of TRPs 341, 342, 343, 344, 361, 362, and 363 may use a beamforming function using multiple antennas. FIG. 3 illustrates a case in which beamforming is performed using multiple antennas at the TRPs 341 and 361. Although FIG. 3 illustrates a case in which beamforming is performed at two TRPs 341 and 361 due to limitation of the drawing, other TRPs may also use the beamforming function. Each of the plurality of TRPs 341, 342, 343, 344, 361, 362, and 363 may exchange signals with a counterpart communication node without interference through a plurality of formed beams. Each of the plurality of TRPs 341, 342, 343, 344, 361, 362, and 363 may refer to a (remote) radio transceiver, remote radio head (RRH), wireless antenna, transmission point (TP), transmission and reception point (TRP), or the like.

Each of the plurality of DUs 330, 331, 332, 333, and 334 may be wired or wirelessly connected to a communication node in the direction of the core network 380. The communication node in the direction of the core network 380 may be another DU or may be the CU 320.

Each of the plurality of DUs 330, 331, and 332 wired to the communication node in the direction of the core network 380 may configure some functions of the radio access protocol of the base station in the radio section to provide radio access to at least one terminal, and may be connected to the CU 320 in a wired section.

Each of the plurality of DUs 333 and 334 wirelessly connected to the communication node in the direction of the core network 380 may configure some functions of the radio access protocol of the base station in the radio section to provide radio access to at least one terminal, and may configure some functions of the radio access protocol of the terminal in the radio section to wirelessly connect to a relay device in the direction of the CU 320, thereby being connected to the CU 320 in both directions. Therefore, the DUs 333 and 334 wirelessly connected to the communication node in the direction of the core network 380 should have both some functions of the base station radio access protocol and some functions of the terminal radio access protocol.

For example, the DU 333 may wirelessly connect to the DU 332 in the direction of the CU 320. Therefore, the DU 332 may be a relay device that relays the connection between the DU 333 and the CU 320. The DU 334 may wirelessly access the DU 333 in the direction of the CU 320. Therefore, the DU 333 may be a relay device that relays the connection between the DU 334 and the CU 320. The plurality of TRPs 343 and 344 connected to the DU 334 may form a beam or may be configured in a region where interference is reduced by a physical method. The TRP 343 may configure some functions of the base station radio access protocol, and the TRP 344 may configure some functions of the terminal radio access protocol.

When a plurality of communication nodes exchange signals using a plurality of beams 160, 161, 162, 350, 351, and 352 formed by the respective communication nodes, each communication node may exchange signals through a beam paired (configured) with a counterpart node. To this end, a plurality of beams of the counterpart communication node are searched, reception strength of each beam is measured, and at least one beam for exchanging signals may be configured based on selection by a communication node participating in communication. In addition, at least one beam for exchanging signals, that is, a beam configured by a specific communication node participating in communication may be changed. A quality of a radio channel can be maintained by changing the beam of the communication node to correspond to a change of a radio channel state or the movement of the communication node.

Hereinafter, a structure and layer-specific functions of a radio access protocol that provides a radio connection between a base station and a terminal in a wireless communication network will be described. In the present disclosure, the structure of the radio access protocol and the functions of each layer are described for the purpose of describing specific exemplary embodiments only, and are not intended to limit the contents of the present disclosure, and include changes or substitutions included in the concept and technical scope of the proposed techniques.

1.4. Radio Access Protocol

The radio access protocol may provide functions in which a plurality of communication nodes exchange data and control information by using radio resources in a radio section, and may be hierarchically configured. In the cellular communication (e.g., long term evolution (LTE), LTE-Advanced (LTE-A), new radio (NR), etc. which are the 3rd generation partnership project (3GPP) standards), the radio access protocol may include the following layers.

1) radio layer 1 (RL1) which configures physical signals
2) radio layer 2 (RL2) which controls radio transmissions in radio resources shared by a plurality of communication nodes, transmits data to a counterpart node, and converges data from the counterpart node
3) radio layer 3 (RL3) which performs radio resource managements such as network information sharing, radio connection management, mobility management, and quality of service (QOS) management for multiple communication nodes participating in the mobile network.

The radio layer 1 may be a physical layer and may provide functions for data transfer. The radio layer 2 may include sublayers such as a medium access control (MAC), a radio link control (RLC), a packet data convergence protocol (PDCP), a service data adaptation protocol (SDAP), and the like. The radio layer 3 may be a radio resource control (RRC) layer, and may provide an AS layer control function.

Operations such as a start, stop, reset, restart, or expire of a timer defined in relation to an operation of the timer defined or described in the present disclosure may mean or include the operation of the timer or a counter for the corresponding timer without being separately described.

Hereinafter, operation methods of communication nodes in a mobile communication network according to exemplary embodiments of the present disclosure will be described. Even when a method (e.g., transmission or reception of a signal) performed at a first communication node among communication nodes is described, the corresponding second communication node may perform a method (e.g., reception or transmission of the signal) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Figure 4:
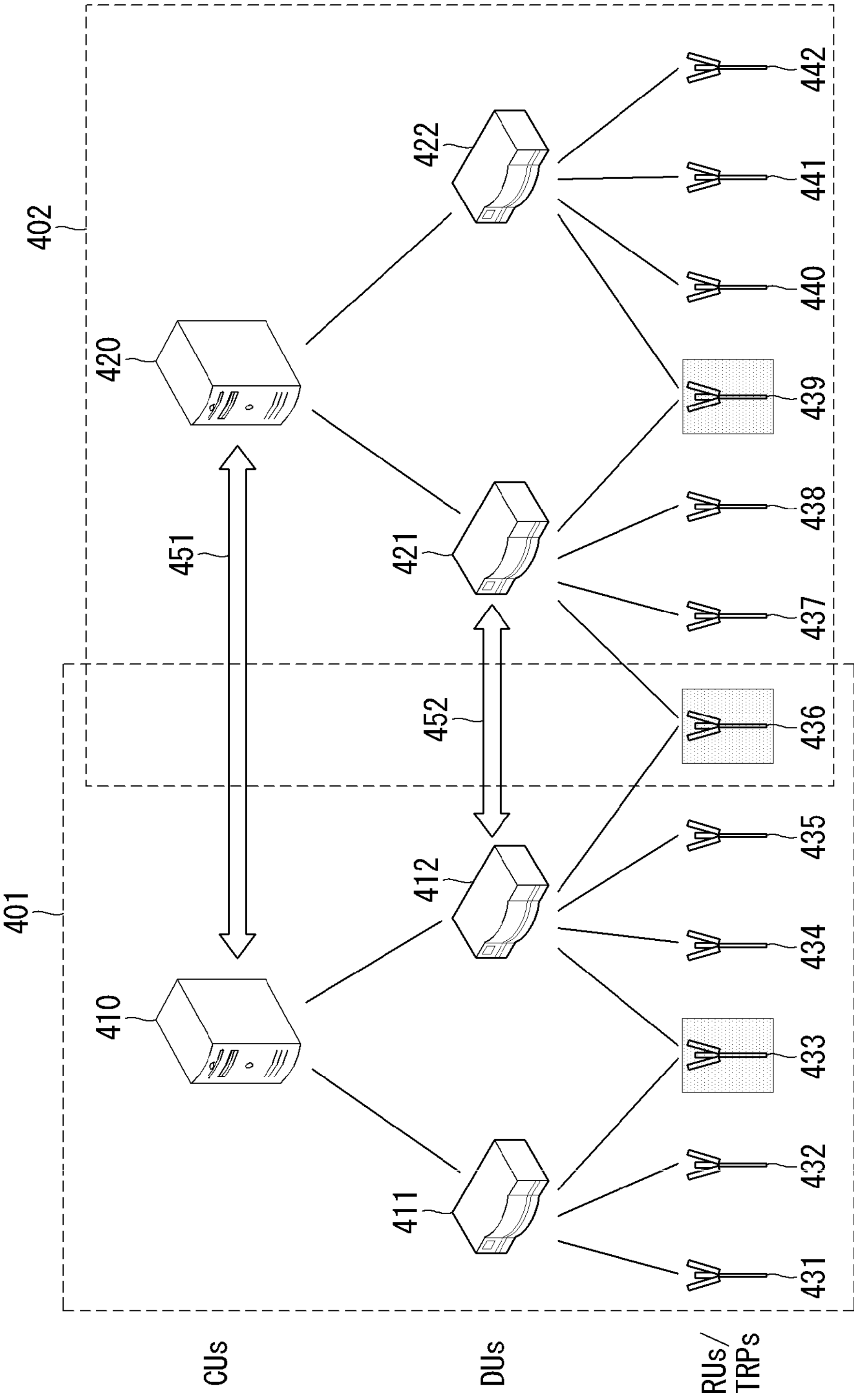
FIG. 4 is a configuration diagram illustrating connections in base stations each having a plurality of TRPs according to an exemplary embodiment of the present disclosure.

FIG. 4 is a configuration diagram illustrating connections in base stations each having a plurality of TRPs according to an exemplary embodiment of the present disclosure.

Referring to FIG. 4, internal configurations of base stations 401 and 402 are respectively illustrated. A form in which the base station 401 includes a CU 410, DUs 411 and 412, and RUs/TRPs 431, 432, 433, 434, 435 and 436 is illustrated. In addition, a form in which the base station 402 includes a CU 420, DUs 421 and 422, and RUs/TRPs 436, 437, 438, 439, 440, 441 and 442 is illustrated. In the example of FIG. 4, the base stations 401 and 402 will be described assuming that they are gNBs according to a 5G communication system.

The DU 411 included in the base station 401 may be connected to three different TRPs 431, 432, and 433, and the DU 412 included in the base station 401 may be connected to four different TRPs 433, 434, 435, and 436. The DU 421 included in the base station 402 may be connected to four different TRPs 436, 437, 4438, and 439, and the DU 422 included in the base station 402 may be connected to four different TRPs 439, 440, 441, and 442.

The example illustrated in FIG. 4 shows a case assuming that one RU corresponds to one TRP. According to an exemplary embodiment of the present disclosure, one RU may correspond to one TRP. According to another exemplary embodiment of the present disclosure, a plurality of TRPs may correspond to one RU. According to yet another exemplary embodiment of the present disclosure, one TRP may correspond to a plurality of RUs. Here, 'correspond to' may mean that the respective components may be connected based on a wired or wireless communication scheme. Therefore, in the present disclosure, a TRP may be understood as an RU, except when the RU and TRP are specifically distinguished and described.

The TRP according to the present disclosure may be classified into a single access TRP and a dual access TRP according to a connection state. Referring to FIG. 4, the single access TRPs 431, 432, 435, 437, 438, 440, 441, and 442 and the dual access TRPs 433, 436, and 439 are illustrated.

2. Dual Access TRP

The dual access TRP may be connected to one or a plurality of gNBs, and may transmit signals of a gNB to a terminal and receive signals for a terminal from a gNB. More specifically, the TRP may include a function of generating a radio signal based on data received from a gNB and transmitting it to a terminal, or a function of generating data to be transmitted to a gNB based on a radio signal received from a terminal. That is, the TRP may correspond to a device that performs a function of transmitting and receiving a radio signal, and is a part of a base station (e.g., gNB) as illustrated in FIG. 4. The TRP described above may be understood as an RU.

The TRP 433 included in the base station 401 may be connected to different DUs 411 and 412 within the same base station 401. In addition, the TRP 439 included in the base station 402 may be connected to different DUs 421 and 422 within the same base station 420. However, the TRP 436 may be connected to the DU 412 of the base station 401 and the DU 421 of the base station 402 at the same time. As described above, the dual access TRP may belong to different base stations or to one base station.

Meanwhile, as illustrated in FIG. 4, an interface 451 between the CUs 410 and 420 and an interface 452 between the DUs 412 and 421 included in different base stations are illustrated. The interface between the CUs 410 and 420 may use an X2 interface defined as an inter-base station interface in the 5G system. In addition, the interface between the DUs 412 and 421 may be newly defined and used as a direct interface between the DUs, or the DUs 412 and 421 may be connected through the CUs 410 and 420 connected to the corresponding base stations. Alternatively, the DUs 412 and 421 may be connected through TRP(s) shared by the DUs.

Using the configuration described above and illustrated in FIG. 4, operations of each component according to the present disclosure will be further described.

2.1. Architecture

The TRP is a transmission and reception point that transmits and receives radio signals. A gNB, which is a base station of the 5G communication system, may be functionally composed of a CU, DU(s), and remote unit(s) (RU(s)), and the RU may include a TRP. From the perspective of functional split of Cloud-RAN, the RU may be configured according to selection of a functional split scheme. The RU may be split into a higher physical layer and a lower physical layer (i.e., High-PHY< >Low-PHY) based on Option 7 scheme, or may be split into a physical layer and a radio section (i.e., PHY< >RF section) based on Option 8 scheme.

DU operations: Each of the DUs 411, 412, 4211, and 422 may generate data to be transmitted to the terminal using a radio signal for a restricted radio resource, and may transmit the generated data to each of the corresponding RU 431, 432, 433, 434, 435, 436, 437, 438, 439, 440, 441, and/or 442. Each of the DUs 411, 412, 421, and 422 may receive the data corresponding to the restricted radio resource among data received from the corresponding RU.

Dual access RU operations: Each of the dual access RUs 433, 436, and 439 may receive data to be transmitted to a terminal from a plurality of DUs, generate a radio signal for transmitting the data to the corresponding terminal(s), and transmit the data to the terminal through the radio signal. The dual access RUs 433, 436, and 439 may transmit radio signals received from the terminal to a plurality of DUs.

Single access RU operations: Each of the single access RUs 431, 432, 434, 435, 437, 438, 449, 441, and 442 may be connected to one DU existing within the same base station, and may transmit/receive a radio signal with at least one terminal, and exchange (transmit/receive) data with the corresponding DU.

Synchronization condition: Each of the RUs 431 to 442 may compensate for errors in synchronization signals used by a plurality of DUs.

RU/TRP: The RU is a device that includes a TRP, which means a signal transmission point in the specification, and performs some functions of the physical (PHY) layer by being connected to the DU. From the perspective of the radio interface, the RU may be interpreted as an element constituting the network at the rear end of the TRP. As mentioned above, in the present disclosure, a TRP is used to denote an RU, and a case where a TRP is described separately from an RU will be separately described.

2.1.1. Dual Access TRP

Dual access TRP: Each of the dual access RU/TRPs 433, 436, and 439 is a device that performs some functions of the PHY layer by being connected to two or more DUs. The dual access RU/TRPs 433, 436, and 439 may perform some functions of the PHY layer, which include receiving and multiplexing data provided by two or more DUs, for data or signal transmission operations to the terminal. The dual access RU/TRPs 433, 436, and 439 may generate a signal for transmission on the radio interface, and transmit the generated signal. For a reception operation from the terminal, the dual access RU/TRPs 433, 436, and 439 may perform some functions of the PHY layer on the radio signal received through the radio interface. The dual access TU/TRPs 433, 436, and 439 may provide the received data to the corresponding DUs.

Example of functional split: Each of the dual access TRPs 433, 436, and 439 may be connected to multiple DUs, and implement PHY functions with the DUs according to a functional split scheme. This will be described with reference to FIG. 5.

Figure 5:
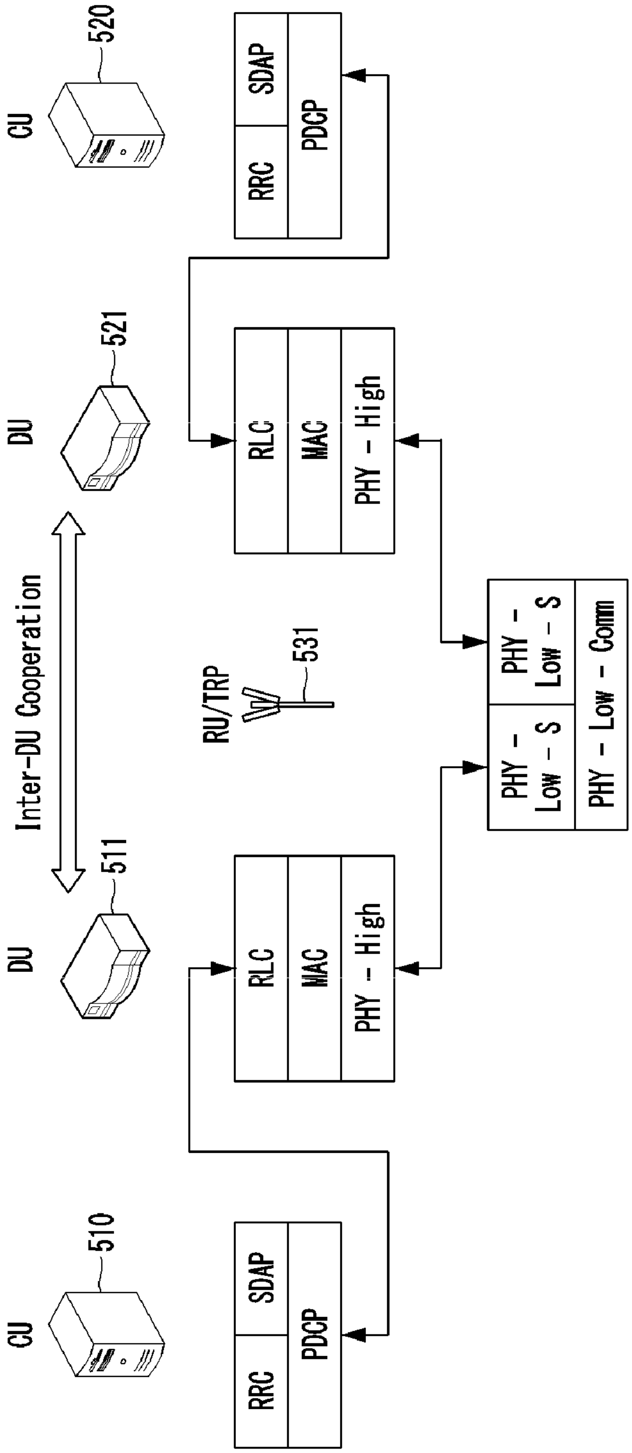
FIG. 5 is a diagram illustrating a hierarchical configuration of base stations including a dual access TRP according to the present disclosure.

FIG. 5 is a diagram illustrating a hierarchical configuration of base stations including a dual access TRP according to the present disclosure.

Referring to FIG. 5, CUs 510 and 520 may perform functions of a radio resource control (RRC) layer, service data adaptation protocol (SDAP) layer, and packet data convergence protocol (PDCP) layer. The SDAP layer is a layer defined for quality of service (QOS) flow processing on the 5G radio interface.

The DUs 511 and 521 may perform functions of a radio link control (RLC) layer, medium access control (MAC) layer, and physical higher (PHY-High) sublayer. However, the configuration of the protocol between the CUs 510 and 520 and the DUs 511 and 521 of FIG. 5 corresponds to one example, and may be configured variously according to an implementation scheme.

In addition, a physical layer split between the DU 511 or 521 and the dual access TRP 433, 436, 439, or 531 may be composed of a physical higher (PHY-High) sublayer, physical lower-split (PHY-Low-S) sublayer(s), and physical lower-common (PHY-Low-Comm) sublayer. The PHY-High sublayer refers to a function located in each of the DUs 411, 412, 421, 422, 511, and 521, and corresponds to a higher function of the PHY layer. As described above, the PHY-High sublayer may vary depending on an implementation scheme of the Cloud-RAN system.

Meanwhile, in the present disclosure, since the PHY layer is split into three parts, a form in which it is split into sublayers will be described. However, it should be noted that these sublayers are only for describing one implementation example, and are not intended to limit the present disclosure.

As illustrated in FIG. 5, each of the dual access TRPs 433, 436, 439, and 531 may include PHY-Low-S sublayer(s) and a PHY-Low-Comm sublayer. Since a PHY-Low-S sublayer is located in a TRP 531 and performs functions corresponding to each DU, a PHY-Low-S sublayer corresponding to a connected DU may exist. One PHY-Low-S sublayer of the dual access TRPs 433, 436, 439, and 531 may be provided for each connected DU. That is, each of the plurality of PHY-Low-S sublayers included in each of the dual access TRPs 433, 436, 439, and 531 may be connected to a corresponding one DU.

The PHY-Low-Comm sublayer interworking with each of the PHY-Low-S sublayers corresponding to each DU refers to a physical lower function related to a radio signal transmitted and received through the radio interface of the TRP 531, and has a characteristic connected to a plurality of PHY-Low-S sublayers. The PHY-Low-Comm sublayer may provide a radio interface for transmitting data received from each PHY-Low-S sublayer to a terminal. In addition, the PHY-Low-Comm sublayer may provide data received from a terminal through the radio interface to the PHY-Low-S sublayer.

The DUs 411, 412, 421, 422, 511, and 521 may configure a radio interface protocol with the corresponding CUs 410, 420, 510, and 520 according to a functional split scheme.

Terminal side: A terminal connected to a gNB having the form of the base station illustrated in FIG. 4 and the protocol structure illustrated in FIG. 5 may configure a radio protocol on a radio interface to transmit and receive radio signals for data transmission with the base station gNB. The terminal may configure and use a radio protocol in a manner of transmitting and receiving radio signals in the TRP 531. A DU corresponding to the terminal may be determined and operated. More specifically, a DU corresponding to a certain time is determined, and as a radio protocol corresponding to the DU, a PHY-High sublayer, a PHY-Low-S sublayer, and a PHY-Low-Comm sublayer may be determined.

For example, when a specific terminal communicates with the DU 511 at an arbitrary time, a radio protocol composed of the PHY-Low-Comm sublayer in the TRP 531, PHY-Low-S sublayer connected to the DU 511, and PHY-High sublayer of the DU 511 may be used. Similarly, considering a case where the terminal communicates with the DU 521 at an arbitrary time, a radio protocol composed of the PHY-Low-Comm sublayer in the TRP 531, the PHY-Low-S sublayer connected to the DU 521, and the PHY-High sublayer of the DU 521 may be used.

These protocols operate as protocols corresponding to the radio protocol of the terminal and exchange data with the terminal using radio signals transmitted and received with the terminal. The PHY-High sublayer and the PHY-Low-S sublayer may be changed and operated according to a DU to be subsequently switched. As a DU switching procedure, a switching time detection procedure, a switching procedure, and the like should be performed. When a TRP is not switched while the DU is switched, the PHY-Low-Comm sublayer that finally generates radio signals may be maintained.

Implementation Characteristics: The dual access RU/TRPs 433, 436, 439, and 531 receive data from the corresponding DUs 412, 421, 512, and 521, respectively, and generate radio signals to be transmitted over the radio interface. Since a radio signal received by the terminal is generated in the PHY-Low-Comm sublayer, if the TRP is maintained even if the DU is switched, radio signal characteristics such as band/frequency/synchronization signal may be maintained at the terminal. In particular, in a process of receiving and generating data signals from different DUs for two terminals connected to one dual access TRP, the important band/frequency/synchronization in radio signals may be operated by the PHY-Low-Comm sublayer. This has an advantage that even if the radio signal is generated from data generated in each DU, the DU does not affect errors of the radio signal because the radio signal is generated by one RU (or TRP).

2.1.2. Inter-DU Cooperation

Scheduling per DU: As a main function of the DUs 411, 412, 421, 422, 511, and 521, scheduling for allocating radio resources configured in multiple dimensions such as time/frequency/space is important. A function of allocating radio resources to users such as base stations/terminals in operation units (e.g., slot(s), TTI(s), etc.) on the radio interface may be performed in the DUs 411, 412, 421, 422, 511, and 521. A DU performing a function of allocating radio resources operated on the radio interface of the dual access TRP 433, 436, 439, or 531 is required. In general, a scheduler performing the function for allocating radio resources to users is a function performed by the DU 411, 412, 421, 422, 511, or 521. That is, a scheduler (not shown) located in the DU 411, 412, 421, 422, 511, or 521 may allocate radio resources to users. When a scheduler corresponding to radio resources is determined for a specific dual access TRP at a specific time, it means that a corresponding DU is determined. Accordingly, radio resources managed by the scheduler may be fixed from the perspective of each of the DUs 412, 421, 511, and 521 connected to the dual access TRPs 431, 436, 439, and 531. Each of the DUs 412, 421, 511, and 521 connected to the dual access TRPs 431, 436, 439, and 531 may determine a user to allocate a radio resource for each radio resource, share resource allocation information on the radio interface, and perform transmission/reception operations with the base station and the terminal for each radio resource.

Inter-DU cooperation: As described above, in order to determine radio resources managed by each DU, a negotiation procedure between the DUs 412, 421, 511, and 521 connected to the dual access TRPs 431, 436, 439, and 531 may be required. In order to determine radio resources managed by each DU among the DUs 412, 421, 511, and 521 connected to the dual access TRPs 431, 436, 439, and 531, a negotiation procedure for radio resources may be performed between the DUs 412, 421, 511, and 521 connected to the dual access TRPs 431, 436, 439, and 531.

In the present disclosure, a case assuming that each of the DUs 412, 421, 511, and 521 connected to the dual access TRPs 431, 436, 439, and 531 can use radio resources that can be used by the TRP connected to itself through negotiation with other DUs 412, 421, 511, and 521 will be described. However, when the DUs 412, 421, 511, and 521 connected to the dual access TRPs 431, 436, 439, and 531 perform scheduling using only predetermined radio resources, the radio resource negotiation procedure may not be required. The present disclosure does not exclude the case where the DUs 412, 421, 511, and 521 connected to the dual access TRPs 431, 436, 439, and 531 perform scheduling using only predetermined radio resources.

An increase or decrease in radio resources operated by the DU is required proportionally according to an increase or decrease in radio traffic processed by each DU. As a procedure for dividing and operating fixed radio resources between DUs on the radio interface, a negotiation procedure between the DUs may be performed. In a method of variably operating radio resources in a manner in which radio resources increase or decrease according to an increase or decrease in radio traffic for each DU, the radio resource negotiation procedure between the DUs is required. Therefore, in the method of variably operating radio resources in the manner in which radio resources increase or decrease according to an increase or decrease in radio traffic for each DU, the negotiation procedure between the DUs may be performed for each unit time. For this cooperation, a direct interface between the DUs may be configured.

X2 structure: Since an X2 interface is configured as an interface between gNBs, which are base stations of the 5G communication system, information negotiated between the DUs may be exchanged on the X2 interface. In the current technical specification, for the X2 interface, a signaling procedure between gNBs is defined. Therefore, a negotiation procedure related to scheduling for each unit time may be performed between the DUs through a connection provided by the X2 interface. In the case of using the X2 interface between the DUs, negotiation information may be delivered actually through a F1 interface between DU and CU and an X2 interface between CU and CU. Accordingly, in the example of FIG. 5, negotiation information between the DU 511 and the DU 521 is provided to the CU 510 through the F1 interface between the DU 511 and the CU 510, and the CU 510 may deliver the negotiation information to the CU 520 using the X2 interface. The CU 520 may provide the negotiation information received from the DU 511 through the CU 510 to the DU 521 through the F1 interface. Even when the DU 521 provides negotiation information to the DU 511, it may be delivered through the reverse direction of the interfaces described above.

TRP structure: As described in FIGS. 4 and 5, since the TRPs 431, 432, 433, 434, 435, 436, 437, 438, 439, 440, 441, 442, 531 are connected to the DUs 411, 412, 421, 422, 411, and 521, a connection between DUs may be configured via the corresponding dual access TRP. The DUs 412, 421, 511, and 521 connected to the dual access TRPs 433, 436, 439, and 531 configure a bidirectional communication path with the corresponding TRPs 433, 436, 439, and 531, so that the connection between DUs may be configured in a structure of DU< >TRP< >DU. In this case, a capacity allocated for the connection between DUs is additionally required for the connection between DU and TRP.

Figure 6A:
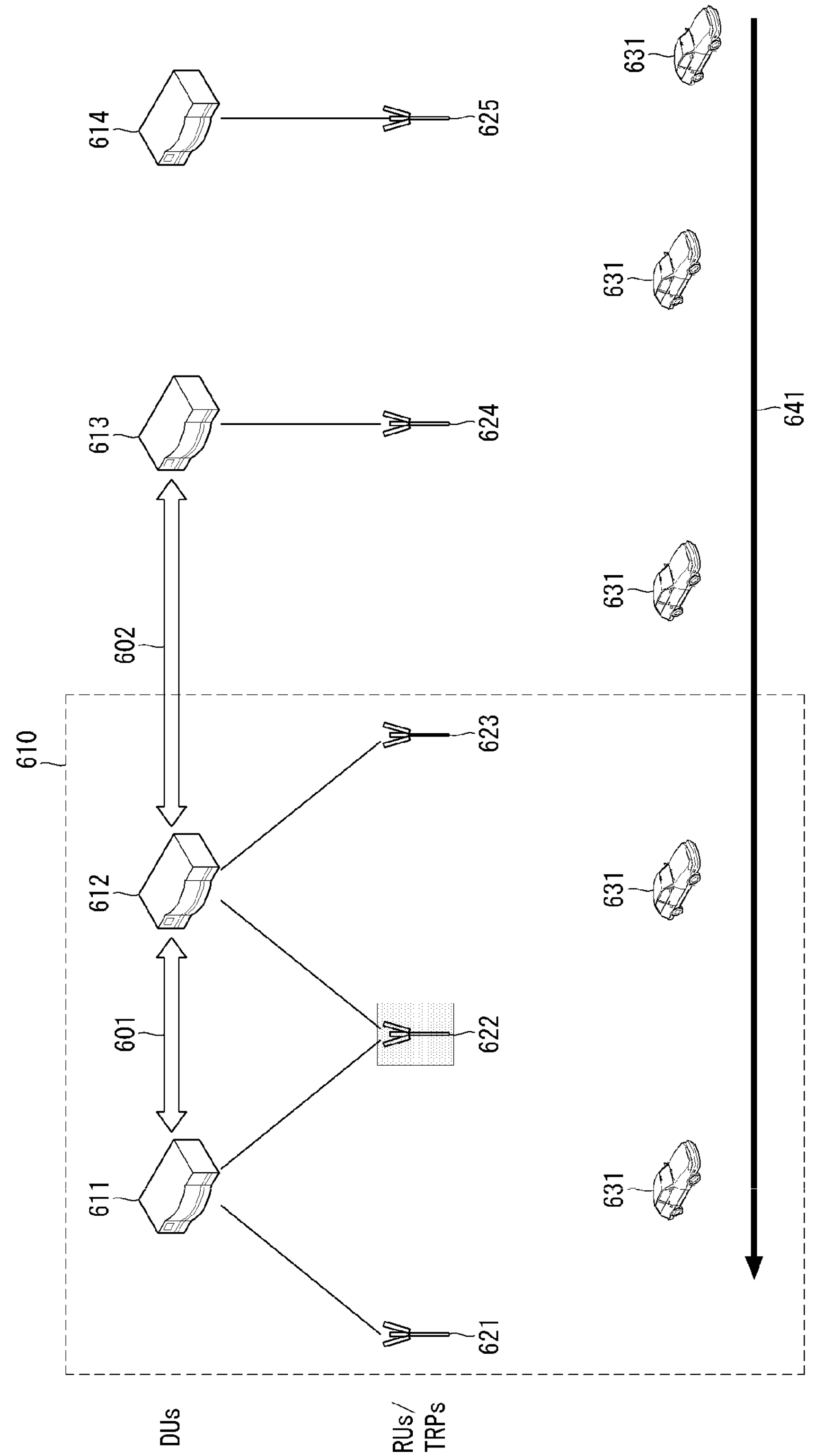
FIG. 6A is a conceptual diagram of a base station network for describing a connection between DU and TRP according to an exemplary embodiment of the present disclosure.

FIG. 6A is a conceptual diagram of a base station network for describing a connection between DU and TRP according to an exemplary embodiment of the present disclosure.

Referring to FIG. 6A, DUs 611, 612, 613, and 614 may be connected to at least one TRP 621, 622, 623, 624, and 625. Specifically, the DU 611 may be connected to the TRPs 621 and 622, the DU 612 may be connected to the TRPs 622 and 623, the DU 613 may be connected to the TRP 624, and the DU 614 may be connected to the TRP 625. Also, in the example of FIG. 6A, the DUs 611 and 612 constitute one gNB 610, and the DUs 613 and 614 may belong to different base stations. More specifically, the TRP 624 and the DU 613 belong to one gNB, and the TRP 625 and the DU 614 may belong to a gNB different from the gNB to which the TRP 624 and the DU 613 belong.

As another example, the DUs 613 and 614 may belong one base station. That is, the TRPs 624 and 625 and the DUs 613 and 614 may belong to one gNB. Also, a reference numeral 610 in FIG. 6A may indicate a base station or a coverage covered by the base station.

Between the DUs 611 and 612 belonging to one gNB 610, the above-described inter-DU cooperation may be performed. The inter-DU cooperation may be performed through a CU (not shown in FIG. 6A) to which the DUs 611 and 612 are connected. As another example, since the DUs 611 and 612 share the TRP 622, they may cooperate using a scheme of DU TRP< >DU. As yet another example, when a separate interface is defined between the DUs 611 and 612 belonging to the gNB 610, the cooperation may be performed using the corresponding interface. A connection 601 between the DUs 611 and 612 illustrated in FIG. 6A illustrates cooperation in one of the schemes described above.

In addition, cooperation between the DU 611 belonging to one gNB 610 and the DU 613 belonging to another gNB may be performed in one of the schemes between the DUs 611 and 612 belonging to one gNB 610 described above. A connection 602 between the DU 611 belonging to one gNB 610 and the DU 613 belonging to another gNB illustrates the cooperation between DUs belonging to different base stations.

A terminal 631 is also illustrated in FIG. 6A. When the terminal 631 moves as shown by a reference numeral 641 from a communication coverage of the TRP 625 connected to the DU 614, it may move to a coverage of the TRP 624 connected to the DU 613. In addition, when the terminal 631 moves as shown by the reference numeral 641 from the communication coverage of the TRP 624 connected to the DU 613, it may move to a coverage of the TRP 623 connected to the DU 612.

2.2. Terminal Experience

Single access, typical handover: The terminal 631 may receive a signal transmitted by the TRP. When the terminal 631 moves away from the TRP with which it communicates, a strength of the received signal decreases. When the terminal 631 is located at a boundary of a specific TRP (hereinafter referred to as a 'serving TRP') providing a service, the terminal 631 may receive a signal of another TRP. An inter-TRP handover for a case where the serving TRP for the terminal 631 and one neighboring TRP operate separately will be described.

Referring to FIG. 6A, when two different TRPs operate separately, the two different TRPs may be the TRPs 625 and 624 or the TRPs 624 and 623. This is because the single access TRP 624 is connected to the DU 613 and the single access TRP 625 is connected to the DU 614. Similarly, referring to FIG. 6A, the single access TRP 624 is connected to the DU 613 and the single access TRP 623 is connected to the DU 612. However, since the cooperation 602 can be performed between the DUs 612 and 613, additional operations may be performed. Therefore, the case of single access and typical HO will be described with reference to FIG. 6B using the configuration formed between the TRPs 625 and 624.

Figure 6B:
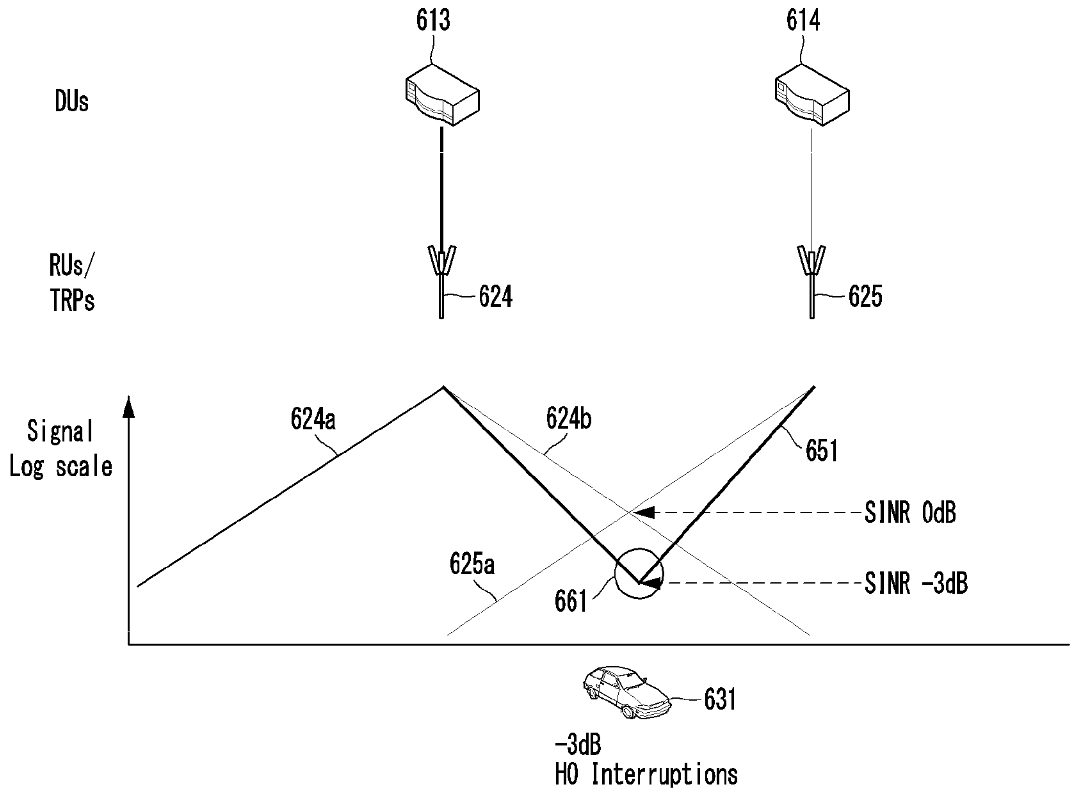
FIG. 6B is an exemplary diagram for describing handover in single access TRPs according to an exemplary embodiment of the present disclosure.

FIG. 6B is an exemplary diagram for describing handover in single access TRPs according to an exemplary embodiment of the present disclosure.

FIG. 6B is a diagram separately extracted and illustrated to describe the handover between the TRPs 625 and 624 from FIG. 6A described above. Accordingly, configurations identical to those of FIG. 6A will be described using the same reference numerals.

The DU 614 may be connected to one TRP 625, and another DU 613 may be connected to another TRP 624. It is assumed that the terminal 631 initially communicates in the coverage of the TRP 624 connected to the DU 614. Accordingly, the initial serving TRP of the terminal 631 may be the TRP 625. As illustrated by the reference numeral 641 in FIG. 6A, the case where the terminal 631 moves to the target TRP 624 may be considered.

When the terminal 640 communicating at the location of the TRP 625 moves in the direction of the TRP 624 and enters a handover region, a signal strength 625*a* from the TRP 625 may decrease. In FIG. 6B, the reference numerals 624*a* and 624*b* denote a signal strength value on a log scale proportional to a distance between the TRP 624 and the terminal 631, and the reference numeral 625*a* indicates a signal strength value on a log scale proportional to a distance between the TRP 625 and the terminal 631.

Looking further into the graph illustrated in FIG. 6B, the strength of the signal received at the terminal 631 from the TRP 625 generally increases or decreases in proportion to the square of the distance. Therefore, since the signal strength in FIG. 6B illustrates a signal strength on a log scale, the log scale signal strength 625*a* corresponding to the distance from the TRP 625 to the direction of the TRP 624 may decrease linearly in proportion to the distance from the TRP 625. Since the signal strength is proportional to the square of the distance, the log scaling on the signal strength may have linear characteristics. In addition, the example of FIG. 6B may be an ideal case assuming that there is no other obstacle or interference between the TRP 625 and the terminal 631.

When interference is considered, a signal received at the terminal 631 from the serving TRP 625 has an SINR value as indicated by a reference numeral 651. That is, since signal(s) received from other neighboring base station(s) act as interference, it has a lower SINR than the reference numeral 625*a*.

A virtual point where a handover occurs is exemplified by a reference numeral 661. When the terminal 631 moves as shown by the reference numeral 641 illustrated in FIG. 6A, the terminal 631 receiving signals transmitted by the two TRPs 624 and 625 operating separately experiences −3 dB SINR at a boundary between the TRPs 624 and 625, and has a characteristic that the received signal rapidly decreases. Therefore, a traditional handover occurs at the virtual handover point as illustrated by the reference numeral 661, and the terminal 631 experiences an interruption time due to the handover. It should be noted that the virtual handover point 661 is referred to as a 'virtual point' because it is difficult to specify a point where an actual handover is performed.

In the single access typical HO environment, a signal transmitted from a neighboring TRP affects a terminal located at a boundary as interference. If the serving TRP increases a power of a transmission signal to overcome the interference to the terminal, the signal received at the terminal 631 may increase, but this requires transmission of high power even in the neighboring TRP, so the interference signal received as a result is also increased. Therefore, the quality of the signal received at the terminal does not increase as the TRP density increases.

Figure 6C:
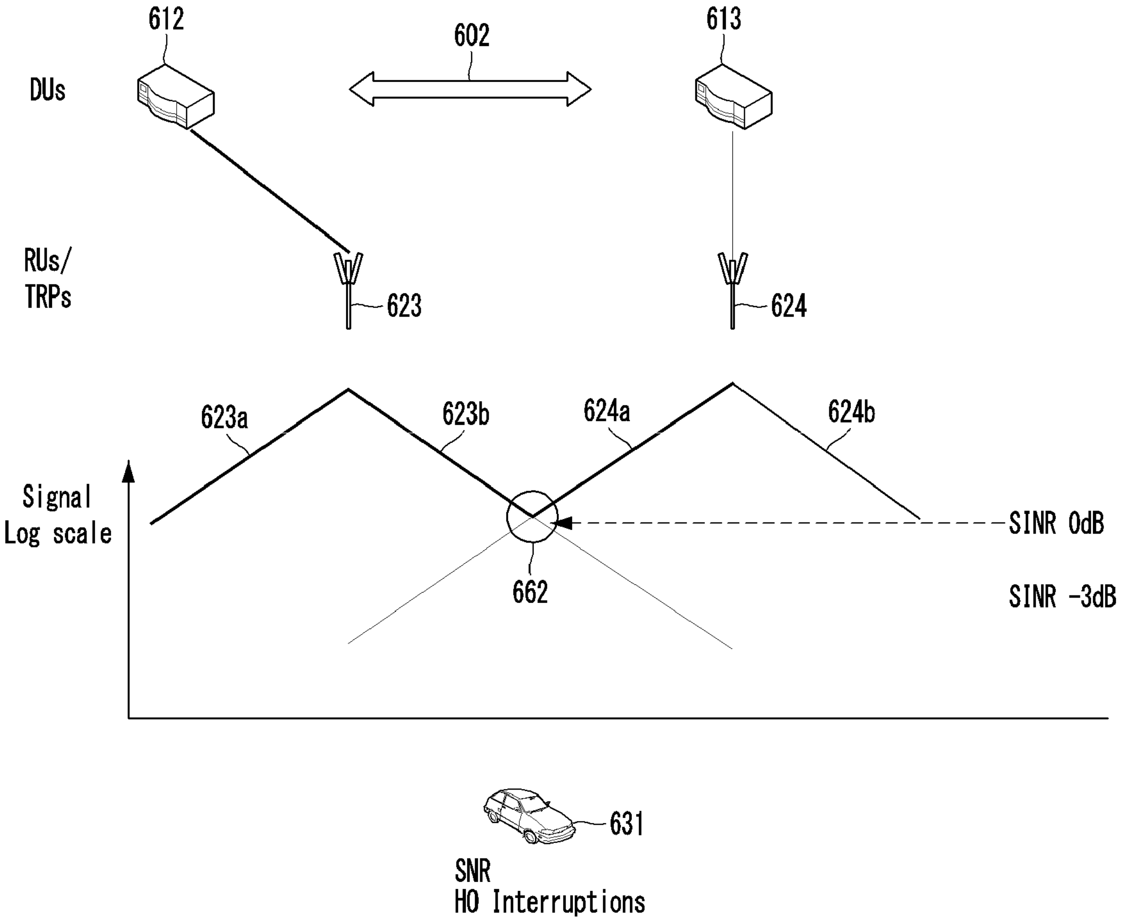
FIG. 6C is an exemplary diagram for describing handover in single access TRPs according to another exemplary embodiment of the present disclosure.

FIG. 6C is an exemplary diagram for describing handover in single access TRPs according to another exemplary embodiment of the present disclosure.

FIG. 6C is also a diagram separately extracted and illustrated to describe the handover between the TRPs 625 and 624 from FIG. 6A described above. Accordingly, configurations identical to those of FIG. 6A will be described using the same reference numerals.

The DU 612 may be connected to one TRP 623, and another DU 613 may be connected to another TRP 624. It is assumed that the terminal 631 initially communicates in the coverage of the TRP 624 connected to the DU 613. Accordingly, the initial serving TRP of the terminal 631 may be the TRP 624. As exemplified by the reference numeral 641 in FIG. 6A, the case in which the terminal 631 moves to the target TRP 623 may be considered.

Single access, Typical HO, Resource nulling: In FIG. 6C, an operation corresponding to the single access typical handover procedure will be described as described in FIG. 6B. However, as shown by the reference numeral 602, a case in which the DUs 612 and 613 cooperate is considered.

On the X2 interface between gNBs, cooperation for the control plane and the data plane may proceed. In the HO procedure through the X2 interface, the terminal 631 may change the serving gNB. In this handover, a cooperation function not specified in the specification may be performed and a negotiation function for radio resources may be included. A resource nulling function in which a neighboring gNB does not use radio resources used by a serving gNB may eliminate the phenomenon in which signals of a neighboring TRP act as interference experienced by the terminal. This will be described with reference to FIG. 6C.

When the terminal 631 moves from the coverage of the TRP 624 to the direction where the TRP 623 is located as shown by the reference numeral 641 illustrated in FIG. 6A, the TRP 624 has a single access connected to one DU 613. Also, the TRP 623 to which the terminal 631 moves corresponds to a TRP located in another gNB. Therefore, when the terminal 631 moves from the center of the TRP 624 to the direction of the TRP 623 and is located at an arbitrary point 662 of a boundary of the TRP 624, a handover that changes the serving TRP 624 may occur in the terminal 631. That is, a handover from the old serving TPR 624 to the new TRP 623 may occur. In this case, interference during the handover may be reduced through inter-base station cooperation (i.e., inter-gNB cooperation) between the DU 612 of the new TRP 623 and the old TRP 624 according to the present disclosure.

According to the present disclosure, resource nulling may be performed through scheduling between the DU 612 of the TRP 623 and the DU 613 of the TRP 624 to prevent the target TRP 623 from performing signal transmission using the same resource as the resource used for communication by the terminal 631 until the terminal is handed over to the target TRP 623. In addition, according to the present disclosure, for a predetermined time after the handover, resource nulling may be performed to prevent the previous serving TRP 624 from performing signal transmission using the same resource as the resource allocated by the target TRP 623 to which the terminal is handed over. As a result, there occurs an advantage in that the terminal 631 experiences less interference at the boundary and receives a high quality signal. In this case, the handover in which the terminal 631 changes the serving gNB occurs at the boundary by using the X2 interface, and the terminal may experience an interruption time due to the handover. However, the signal received at the terminal 631 from the serving TRP 624 or 623 may be a signal without an interference signal. That is, the received signal of the terminal 631 has an SNR quality without interference. As described above, since the terminal 631 receives an interference signal from a neighboring TRP, interference is considered in the received signal, such as a signal to interference noise ratio (SINR). However, when interference from a neighboring TPR is removed through resource nulling, only a signal to noise ratio (SNR) is considered, so transmission efficiency can be improved from the perspective of reception environment of the terminal.

In addition, the SNR quality has a characteristic that is affected by a radio channel of the serving TRP, and is mainly affected by a distance between the serving TRP and the terminal, obstacles, and the like. As a method of providing a high-quality signal to the terminal 631, the density of TRPs may be increased to shorten the distance between the serving TRP and the terminal.

Figure 6D:
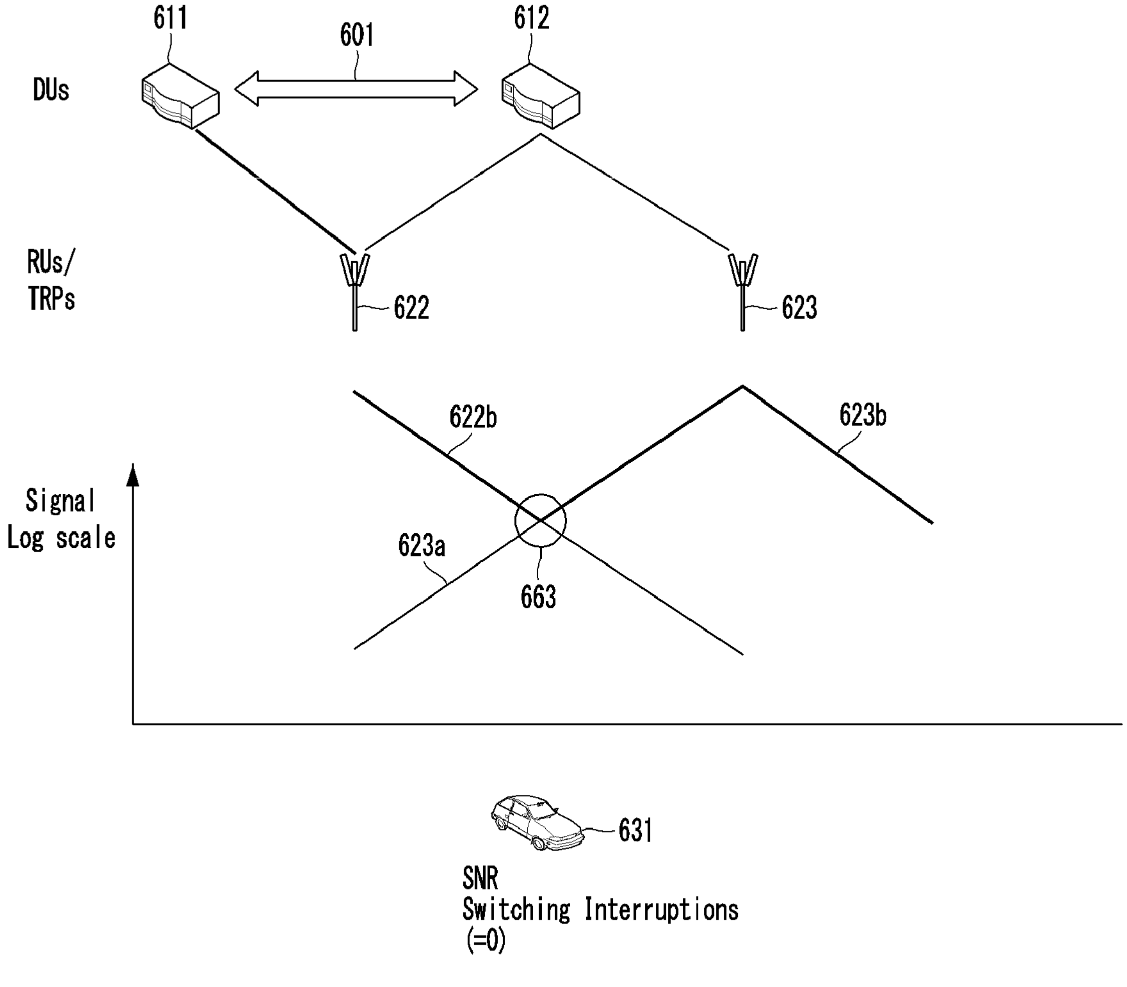
FIG. 6D is an exemplary diagram for describing TRP switching in single access TRPs according to another exemplary embodiment of the present disclosure.

FIG. 6D is an exemplary diagram for describing TRP switching in single access TRPs according to another exemplary embodiment of the present disclosure.

The example of FIG. 6D is also separately extracted and illustrated to describe TRP switching between the TRPs 623 and 622 from FIG. 6A described above. Accordingly, configurations identical to those of FIG. 6A will be described using the same reference numerals.

The DU 612 may be connected to the TRPs 623 and 622, and another DU 613 may be connected to another TRP 622. It is assumed that the terminal 631 communicates in the coverage of the single access TRP 623 connected to the DU 612. Therefore, the serving TRP of the terminal 631 may be the TRP 623. As illustrated by the reference numeral 641 in FIG. 6A, the case where the terminal 631 moves to the target TRP 622 may be considered.

The terminal 631 may move to the coverage of the TRP 622 while communicating with the TRP 623 that is the serving TRP. In this case, it can be seen that a log scale graph 623*a* of the signal strength from the TRP 623 decreases in proportion to the distance. Conversely, the log scale graph 622*b* of the signal strength from the TRP 622 to the terminal 631 also has a form in which the signal strength decreases in proportion to the distance between the terminal 631 and the TRP 622.

In the case of FIG. 6D, even if the terminal 631 performs inter-TRP handover, the DU 612 performing scheduling is not changed, and only the TRPs 622 and 623 connected to one DU 612 are switched. The case where the DU 612 performing scheduling is not changed and the handover of the terminal 631 occurs only between the TRPs in this manner will be referred to as 'TRP switching' in the present disclosure.

Accordingly, the DU 612 does not require the inter-DU cooperation during the handover of the terminal 631 described above with reference to FIG. 6C. That is, the DU 612 may perform resource nulling in the respective TRPs 622 and 623 when the handover of the terminal 631 occurs. However, as illustrated in FIG. 6D, the TRP 622 corresponds to a dual access TRP connected also to another DU 611. Therefore, when resource nulling is performed to provide the handover of the terminal 631, cooperation for nulling the resources of the target TRP 622 while the terminal 631 is connected to the serving TRP 623 may be needed through cooperation with the DU 611.

Dual Access, Resource Nulling:

Referring to FIG. 6D described above, dual access and resource nulling will be described.

FIG. 6D shows a structure in which a plurality of TRPs 622 and 623 are connected to one DU 612. Signals transmitted and received by the respective TRPs 622 and 623 are concentrated in the DU 612 and processed by the DU 612. When the terminal 631 moves and changes the TRP for the purpose of seamless service, for example, when moving as shown by the reference numeral 641 illustrated in FIG. 6A, the TRP may be switched within the same DU 612. When the TRPs 622 and 623 connected to one DU 612 are switched in this manner, a TRP switching procedure may be performed in the centralized DU 612 and a procedure with neighboring nodes may be omitted. As described above, the switching between TRPs connected to one DU may be the TRP switching operation. The TRP switching operation in which handover is performed between TRPs connected to one DU may minimize a signal interruption time from the perspective of the terminal 631. This is advantageous in an operation in which subject TRPs are connected to the same DU. In the present disclosure, by emphasizing meaning of the function performed by being connected to the same DU, it may be referred to as 'inter-TRP switching procedure'. The TRP switching or the inter-TRP switching may apply the resource nulling function that prevents a neighboring TRP from using radio resources used by the serving TRP. The terminal receiving a radio resource used by the serving TRP does not receive an interference signal because the neighboring TRP does not transmit signals in the same resource, so the received signal has an SNR quality. Since the characteristic of the SNR quality has been described above, redundant description will be omitted. As a result, in the handover between TRPs connected to one DU as shown in FIG. 6D, there is an advantage in experiencing reception signal performance of SNR quality and almost zero TRP switching interruption time.

Figure 6E:
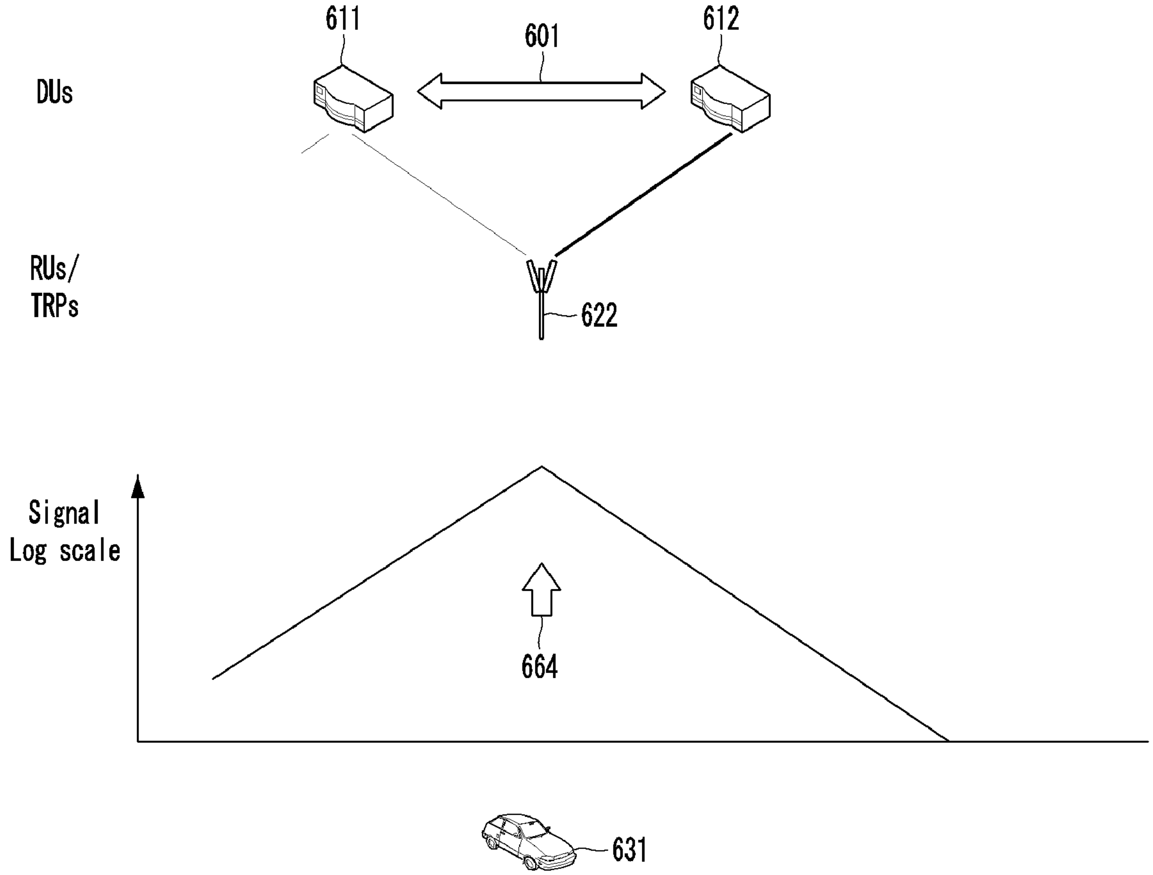
FIG. 6E is an exemplary diagram for describing handover in a dual access TRP according to an exemplary embodiment of the present disclosure.

FIG. 6E is an exemplary diagram for describing handover in a dual access TRP according to an exemplary embodiment of the present disclosure.

In the example of FIG. 6E, the same configurations as those of FIG. 6A described above will be described using the same reference numerals. FIG. 6E shows a case where the TRP 622 is maintained but the DUs 611 and 612 are changed.

The TRP 622 may be connected to the DU 612 and connected to the DU 611 at the same time. In this case, a case in which the terminal 631 moves from the coverage of the DU 612 to the coverage of the DU 611 will be assumed and described. When the terminal 631 moves from the coverage of the DU 612 to the coverage of the DU 611, even though it is located within the same TRP 622, a DU performing scheduling should be changed. Accordingly, in the present disclosure, the DU may be switched based on the movement of the terminal 631. This will be referred to as 'DU switching' in the present disclosure.

Conditions for performing DU switching may be the same as or different from those of TRP switching.

In the case of TRP switching, it may be basically based on received signal strengths of the terminal and TRPs, distance between the TRP and the terminal, presence or absence of neighboring TRPs, and the like. Specifically, in TRP switching, when a terminal moves from a serving TRP to a neighboring target TRP, the TRP switching conditions may be conditions such as signal strengths and distance between the terminal and the serving TRP when the terminal moves from the serving TRP to a target neighboring TRP.

The case where the conditions of DU switching and TRP switching are the same may be cases in which DU and TRP are individually connected. Specifically, as illustrated in FIG. 6B, the DUs 613 and 614 may be connected to the TRPs 624 and 625, respectively. When each of the DUs 613 and 614 is connected to the TRP 624 or 625, the DU switching may have the same conditions as those of TRP switching.

The case where the conditions of DU switching and TRP switching are different may be the case as illustrated in FIG. 6E. That is, it may correspond to a case where the DUs 611 and 612 are connected to the same TRP 622. When each of the DUs 611 and 612 is connected to one TRP 622, that is, when connected to the dual access TRP according to the present disclosure, the DU switching condition may be different from the TRP switching condition.

The DU switching condition may be based on the coverage of the DU. Referring to FIG. 6E, the DUs 611 and 612 may know coverages of the DUs in advance. Such a DU coverage will be described below in FIG. 10 to be described later. Therefore, the DU may recognize that the dual access TRP corresponds to an edge of the DU coverage. Even at the edge of the DU coverage, a strength of a signal received from the dual access TRP may not decrease from the perspective of the terminal connected to the dual access TRP. Accordingly, the DU may determine that the DU switching condition is satisfied when the terminal connected to the dual access TRP moves to its edge region.

Based on this, referring to FIG. 6E, the DU 612 may identify that the terminal 631 moves to the edge region of the DU 612. This identification may be performed using at least one of signal strength information reported by the terminal to the DU 612 through the dual access TRP 622, history information on the movement of the terminal 631, sector information in the dual access TRP, beam direction information according to beamforming in the case of the dual access TRP 622 adopting a MIMO scheme, or combinations thereof.

The DU 612 may determine DU switching to the neighboring DU 611 when the terminal moves to the edge of its own coverage. In general, when the DUs 611 and 612 are included within one base station, the DUs 611 and 612 know about neighboring DUs. In addition, even when the DUs are included in different base stations, each DU may have information about a neighboring DU of itself for scheduling and handover. Since FIG. 6E is a diagram extracted from FIG. 6A, the DUs may be DUs included within one base station. However, the DUs included in different base stations may have information on mutually neighboring DUs. In the present disclosure, it is assumed that DUs have information on neighboring DUs regardless of whether base stations are the same.

Accordingly, when the DU 612 determines DU switching, it may perform inter-DU cooperation so that communication between the neighboring DU 611 and the terminal 631 can be maintained through the dual access TRP 622. The inter-DU cooperation, that is, cooperation for the DU switching, may be a procedure of providing information on resources used by the dual access TRP 622, and information on a time when switching should be performed as well as information on a service provided by the DU 612 through the dual access TRP 622. The information on the service may include a type of the service and a required data rate. The required data rate may include a guaranteed minimum data rate. In particular, in the case of the XR service described as an example in the present disclosure, the guaranteed minimum data rate may be one of very important factors.

The DU 612 may provide DU switching cooperation information (or a DU switching cooperation request message) to the DU 611, and receive a response thereto from the DU 611. Upon receiving an affirmative response from the DU 611, that is, a message accepting use of a resource at a time requested by the DU 612, the UD 612 may transmit a DU switching message based on the switching cooperation information to the dual access TRP 622. When the DU switching is performed so that the dual access TRP 622 maintains communication with the terminal 631 connected to the DU 612, the DU switching message may be a message indicating release of the connection with the dual access TRP 622 at the corresponding time and establishment of the connection between the terminal and the target DU 611.

In this case, the dual access TRP 622 may be scheduled by the DU 611 so that the dual access TRP 622 uses the same resource for the same terminal 631. Accordingly, the terminal 631 may perform only switching at an upper level while maintaining radio resources in the dual access TRP 622. In addition, when new information needs to be provided to the terminal due to the DU switching, the corresponding information may be provided to the terminal. As described with reference to FIG. 5, the DU switching may be informed to the terminal 631 using RLC layer information or MAC layer information.

Further, when the DU 611 cannot accept at least one of the contents included in the DU switching cooperation request message of the DU 612, the DU 611 may provide a negative response or a modification request message to the DU 612. The negative response may include information on a reason why the request is not acceptable. Upon receiving the negative response, the DU 612 may update at least one piece of information in the DU switching cooperation request message, and transmit the updated message to the DU 611. In addition, the modification request message provided by the DU 611 may include information of modification on at least one of elements included in the DU switching cooperation request message. For example, when changing the switching time information, the DU 612 may transmit a modification message including the changed time information to the DU 611. Accordingly, the DU 611 may provide a response to the DU 611 when the modification request message is received.

The inter-DU cooperation may proceed using at least some of the schemes described above. Also, in the above, it is assumed that DUs are included within one base station. However, the above operation is possible even when DUs are included in different base stations.

If a base station is changed, the RRC layer may inform the terminal of the change of the base station using an RRC message.

Meanwhile, during DU switching, information between DUs may be provided through the dual access TRP, information between DUs may be provided using an upper CU, or when a separate interface between DUs is defined, the corresponding interface may be used to deliver the information between DUs.

Meanwhile, during the DU switching, the source DU 612 may provide the DU switching message to the dual access TRP 622. This may include information instructing the terminal 631 to maintain communication based on control from another DU, that is, the neighboring DU 611, from a specific time point. Therefore, upon receiving the DU switching message from the source DU, the dual access TRP 622 may release connection with the source DU from the corresponding time point.

The procedure in which the dual access TRP 622 releases the connection with the source DU may be the procedure of releasing the connection of the PHY-Low-S sublayer between the source DU and the terminal and establishing the connection of the PHY-Low-S sublayer of the target DU, as described with reference to FIG. 5. In this case, as described in FIG. 5, the characteristic that the PHY-Low-Comm sublayer of the dual access TRP 622 is not changed may be utilized. Accordingly, the dual access TRP 622 may transmit information scheduled from the target DU 611 through the PHY-Low-Comm sublayer at the time when the DU switching is performed with respect to the terminal 631.

In the above, the case where the source DU 612 transmits the DU switching message to the dual access TRP 622 has been described. However, the target DU 611 may transmit a DU switching message to the dual access TRP 622. In this case, when the DU 611 transmits an affirmative response message corresponding to the DU switching cooperation information (or DU switching cooperation request message) to the DU 612, the DU switching message may be provided to the dual access TRP 622. Accordingly, when the dual access TRP 622 receives the DU switching message from the source DU 612 or the target DU 611, it may perform the same operations as described above.

As illustrated in FIG. 6E, the DU switching may be performed at a specific location 664 having a high signal strength from the TRP 622. Therefore, unlike typical handovers, the DU switching may occur in a state where the strength of the signal received from the TRP 622 is high. Also, during the DU switching, the TRP 622 may share the PHY-Low-Comm sublayer as described above in FIG. 5. Also, the TRP 622 may include PHY-Low-S sublayers corresponding to the respective DUs 611 and 612.

Figure 6F:
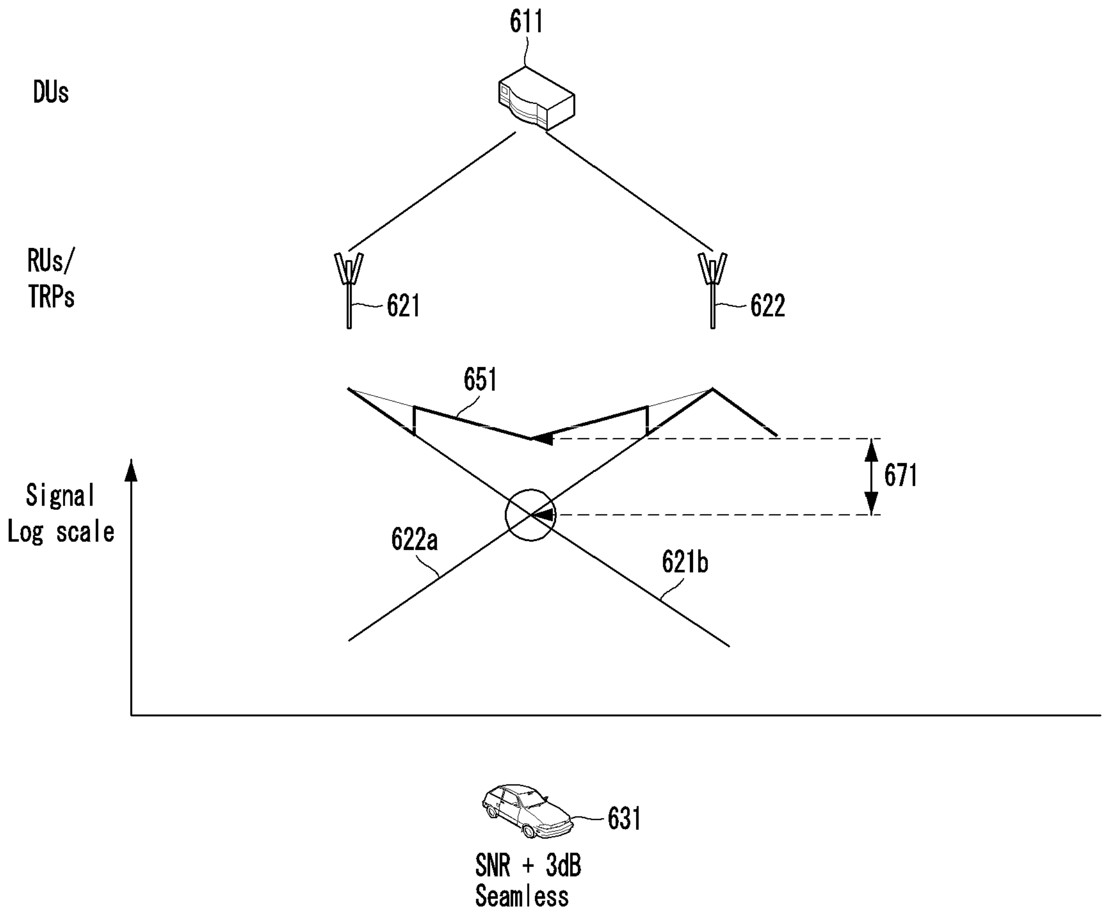
FIG. 6F is an exemplary diagram for describing dual access handover and coordinated multi-point (COMP) transmission and reception of multiple TRPs according to an exemplary embodiment of the present disclosure.

FIG. 6F is an exemplary diagram for describing dual access handover and coordinated multi-point (CoMP) transmission and reception of multiple TRPs according to an exemplary embodiment of the present disclosure.

In the example of FIG. 6F, the same configurations as those of FIG. 6A described above will be described using the same reference numerals. FIG. 6F shows a case in which two different TRPs 621 and 622 are connected to the DU 611. Accordingly, its structure may be similar to that of FIG. 6D. In FIG. 6F, a method for further considering COMP transmission and reception for two different TRPs 621 and 622 connected to one DU 611 in addition to the above-described method will be described.

The DU 611 may be connected to the TRPs 621 and 622. It is assumed that the terminal 631 communicates in the coverage of the TRP 622 connected to the DU 611. Therefore, the serving TRP of the terminal 631 may be the TRP 622. As exemplified by the reference numeral 641 in FIG. 6A, the case in which the terminal 631 moves to the TPR 622 that is the target TRP may be considered.

The terminal 631 may move to the coverage of the TRP 621 while communicating with the TRP 622 that is the serving TRP. In this case, it can be seen that the log scale graph 622*a* of the signal strength from the TRP 622 decreases in proportion to the distance. Conversely, the log scale graph 621*b* of the signal strength from the TRP 621 to the terminal 631 also has a form in which the signal strength decreases in proportion to the distance between the terminal 631 and the TRP 622.

In the case of FIG. 6F, even if the terminal 631 performs inter-TRP handover, the DU 611 performing scheduling is not changed, and only the TRPs 621 and 622 connected to one DU 611 are switched. That is, the TRP switching described above may occur.

In the exemplary embodiment of FIG. 6F, a COMP transmission/reception technique may be utilized in one DU 611. The COMP transmission/reception technique may generally include the above-described resource nulling operation when the TRP 622 is the serving TRP. In addition, when a beamforming method using multiple antennas is used together with resource nulling, it may include preventing transmission beams of the TRP 621 from being directed to the terminal 631 receiving a service from the current TRP 622. In addition, in another form of the COMP scheme, the same data may be transmitted using the same resource during a period of the handover of the terminal 631 from the TRP 622 to the TRP 621. This may be easier because the handover occurs between the TRPs 621 and 622 included within the DU 611.

Then, the operations of FIGS. 6E and 6F, which have been considered above, will be described.

Dual access, CoMP:

Referring to FIG. 6F, the plurality of TRPs 621 and 622 are connected to one DU 611, and a service can be seamlessly provided to the moving terminal 631 by performing TRP switching. The DU 611 may generate a signal corresponding to data to be transmitted to a specific terminal and transmit the signal to the TRPs 621 and 622. In this case, the DU 611 may control the TRPs 621 and 622 to perform data transmission to the terminal 631 using the same resource and data through the TRPs 621 and 622. Accordingly, the terminal 631 may receive signals transmitted by the TRPs 621 and 622. The terminal 631 may combine and process the signals received from the different TRPs 621 and 622 through a signal processing process, so that the quality of the received signal can be improved.

Since the terminal 631 receives the signals from two TRPs 621 and 622 as shown by a reference numeral 651 illustrated in FIG. 6F, the performance of the radio channel increases by 3 dB as shown by a reference numeral 671, and the terminal 631 may experience high radio signal performance of SNR +3 dB. That is, since the DU 611 does not transmit a signal to another terminal through the same radio resource provided to the terminal 631, there is no need to consider interference. In addition, since the same signal is received from two different TRPs 621 and 622 using the same resource, signal reception efficiency can be increased. That is, the terminal 631 can seamlessly receive high quality signals without signal deterioration at the boundary between the two TRPs.

Meanwhile, as illustrated in FIG. 6E, the DU switching procedure for switching DUs within the same TRP 622 has been described. Looking further into the DU switching, since the DU switching procedure is performed at a time when a signal of good quality is exchanged between the terminal 631 and the TRP 622, the signal quality of the radio signal can be maintained high during the DU switching procedure. The DU switching procedure may be used in accordance with wired and wireless procedures for changing nodes in typical HOs. In particular, seamless data exchange is possible because wired and wireless procedures that reduce data transmission/reception interruption can be used.

On the other hand, the terminal 631 described in the present disclosure is characterized in that seamless service is provided by transmitting and receiving high-quality radio signals using signals transmitted and received in the COMP scheme at the boundary of TRPs. In addition, in a location where the terminal 631 transmits and receives a high quality radio signal near the TRP, performance improvement due to signals received from the neighboring TRP is small. Therefore, the terminal 631 has sufficient reception performance only with the signal received from the serving TRP.

A process of switching the TRP in the terminal according to the present disclosure will be described in more detail. The terminal located close to the serving TRP may transmit/receive signals to and from the serving TRP. When the terminal moves to a boundary of the serving TRP, a new neighboring TRP may be added. Thereafter, the terminal may move to a coverage of a new serving TRP, which was previously the neighboring TRP, at the boundary of TRPs. When moving to the new serving TRP, the previous serving TRP becomes a neighboring TRP, and a procedure for deleting the previous serving TRP may be performed. The above procedure is the TRP switching described above. Since the operation of adding or deleting a TRP is a procedure that is performed while the serving TRP is connected, an interruption time in data transmission does not occur. The TRP switching procedure may proceed with a preparation procedure and an execution procedure. In the TRP switching procedure, a basis for determination may be based on the strength of signals received from each TRP. Also, in order to prevent a ping-pong phenomenon (i.e., continuous movements between different TRPs), a hysteresis range may be configured for a signal level of the basis for determination, or a conditional execution may be additionally considered.

2.3. Extreme Reality (XR) and Transmission Processing Time

The XR services require the characteristics of large-capacity transmission and low-latency transmission. Efforts to improve user data rates at cell boundaries or TRP boundaries are ongoing in the 5G communication for a purpose of providing services uniformly. The dual access scheme provided according to the present disclosure may configure a radio environment in which a plurality of TRPs participate to receive high quality radio signals. Therefore, when configuring the wireless communication network environment according to the present disclosure, large-capacity transmission is possible.

The low-latency transmission depends on a transmission processing time, which is a processing time required for a process in which the RU transmits data determined by the DU as a signal. If a short transmission processing time is implemented in downlink, a time required to transmit data to the terminal is shortened, thereby achieving low-latency transmission.

Figure 7A:
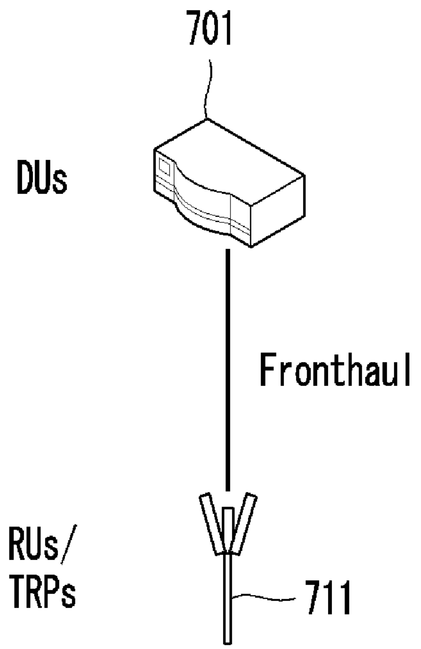
FIG. 7A is an exemplary diagram for describing a connection structure of a direct type between DU and RU constituting a base station.
Figure 7B:
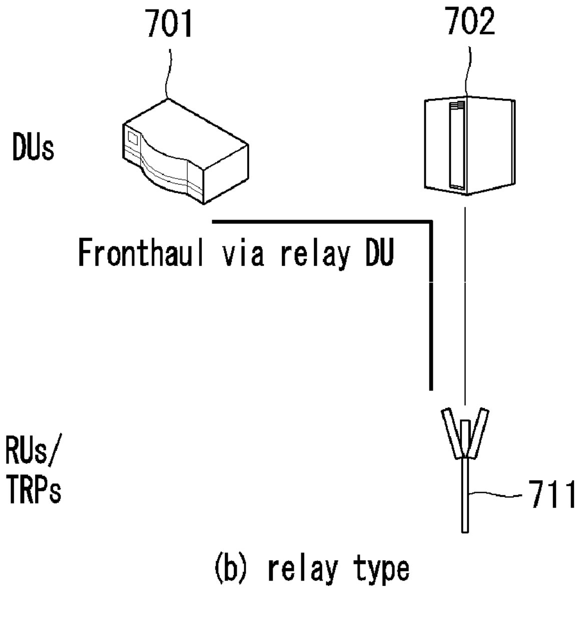
FIG. 7B is an exemplary diagram for describing a connection structure of a relay type between DU and RU constituting a base station.
Figure 7C:
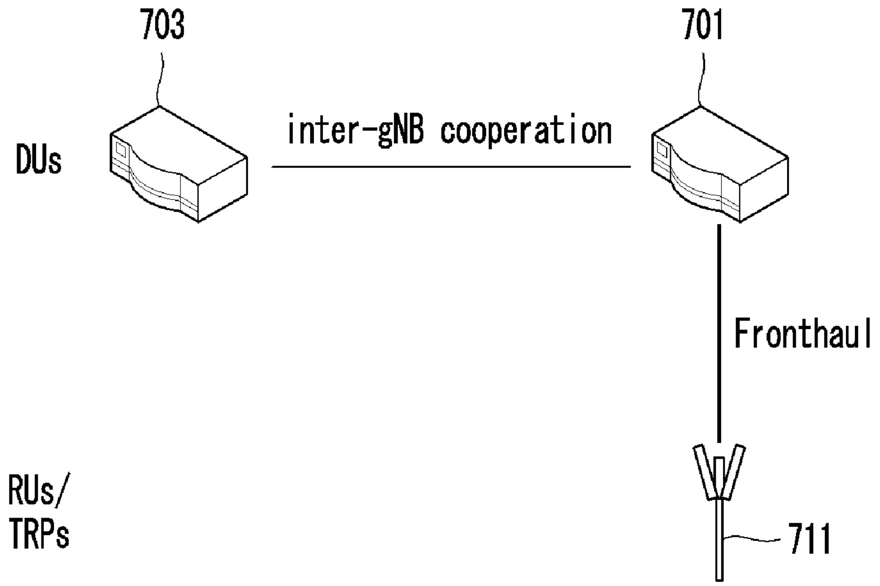
FIG. 7C is an exemplary diagram for describing a connection structure of an inter-gNB type between DU and RU constituting a base station.

FIGS. 7A to 7C are exemplary diagrams for describing connection schemes between DUs and RUs constituting a base station.

Prior to referring to FIGS. 7A to 7C, the present disclosure has described the method of using Cloud-RAN, and it has been described that in Cloud-RAN, one base station can be configured with a CU, one or more DUs, and one or more RUs/TRPs. Also, in the present disclosure, the interface methods between DUs included in different base stations (gNBs) has been described. In FIGS. 7A to 7C, based on these methods, methods in which DUs and RU/TRPs are connected will be described.

The connection scheme between DUs and RUs may be classified to a direct type, a relay type, and an inter-gNB type.

FIG. 7A illustrates a connection structure of a direct type between a DU and an RU. Referring to FIG. 7A, a DU 701 and a TRP 711 are directly connected, and this type is referred to a direct type connection in the present disclosure. Accordingly, the direct type consists of one hop because the DU 701 and the RU 711 are directly connected, and the DU 701 and the RU 711 may be connected through a fronthaul.

FIG. 7B illustrates a connection structure of a relay type between a DU and an RU. The same configurations as those in FIG. 7A will be denoted by the same reference numerals in FIG. 7B. Referring to FIG. 7B, it is different from FIG. 7A in that another DU 702 is included between the DU 701 and the TRP 711. That is, the DU 701 may be connected to the RU 711 through another DU 702, and since the DU 701 is connected to the RU 711 through the DU 702, this may correspond to a two-hop case. In the example of FIG. 7B, only one DU 702 exists between the DU 701 and the RU 711, but a plurality of DUs may be included between the DU 701 and the RU 711. Also, all of the DUs illustrated in FIG. 7B may be DUs included in one same base station. Therefore, the relay-type connection may be a form in which a fronthaul is configured in multi-hop through neighboring DUs within one base station.

FIG. 7C illustrates a connection structure of an inter-gNB type between a DU and an RU. In FIG. 7C, the same reference numerals are used for the same configurations as those in FIGS. 7A and 7B.

Referring to FIG. 7C, the cooperation scheme between gNBs is a configuration in which the gNBs cooperate as being interconnected. In the configuration illustrated in FIG. 7C, the DU 703 and the DU 701 may be included in different base stations. When the DU 701 and RU 711, which are the components illustrated in FIG. 7A, are included in a first base station, the DU 703 may be a component constituting a second base station that is different from the first base station, for example, a base station neighboring to the first base station. The connection of the DU 703 included in the second base station to the RU 711 included in the first base station may be connected through inter-gNB cooperation between the DU 703 and the DU 701. Since the inter-gNB cooperation does not have a protocol for direct communication between the DU 703 and the DU 701, transmission may be performed through the CU (not shown in FIG. 7C) included in each base station. However, if an interface for direct communication between DUs is provided in the future, the corresponding interface may be used. The present disclosure does not place limitations on interfaces that may be developed in the future.

Also, as illustrated in FIG. 7C, the DU 701 and the RU 711 may be connected through a fronthaul. Based on this connection, data requested to be transmitted by the DU 703 included in the second base station, which is a neighboring gNB, may be received by the DU 701 of the second base station directly from the first base station or through the CU of the second base station. The DU 701 included in the second base station may transmit radio signals in downlink through the RU 711 connected through the fronthaul.

Figure 8:
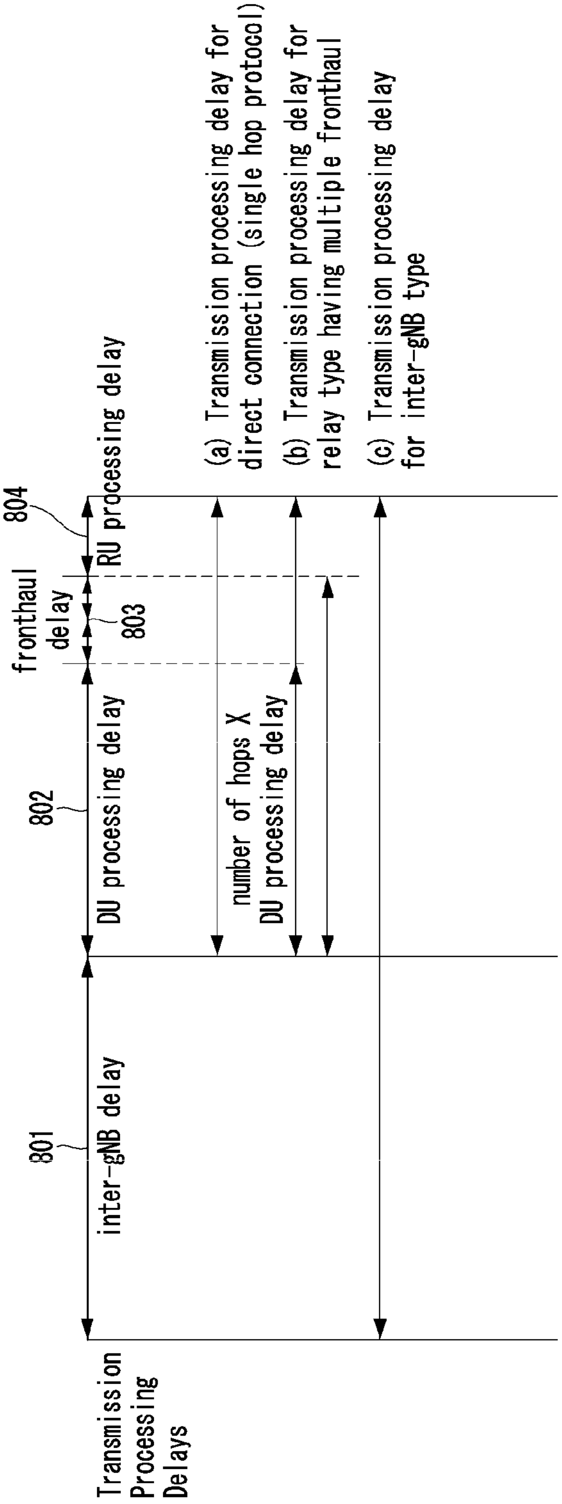
FIG. 8 is an exemplary diagram for describing transmission processing times based on connection schemes between DUs and RUs constituting a base station.

FIG. 8 is an exemplary diagram for describing transmission processing times based on connection schemes between DUs and RUs constituting a base station.

Referring to FIG. 8, a time according to an inter-gNB cooperation delay 801, a time according to a DU processing delay 802 within one DU, a time according to a fronthaul delay 803, and a time according to a RU processing delay 804 are illustrated. In general, the fronthaul delay 803 may be a very short time because the fronthaul is configured using an optical transmission scheme.

As shown in FIG. 7A, the transmission processing time in the direct connection between the DU 701 and the RU 711 may be determined in downlink as a sum of the DU processing delay 802 time, the time of according to the fronthaul delay 803 connecting the DU 701 and the RU 711, and the time of the RU processing delay 804.

As shown in the configuration of FIG. 7B, when at least one DU 702 is included between the DU 701 and the RU 711, the transmission processing time may vary according to the number of hops. Basically, as illustrated in FIG. 8, if at least one DU exists between the DU 701 and the RU 711, the number of hops between the DU and the RU increases. For example, when the DU 701 and the RU 711 are directly connected as shown in FIG. 7A, it corresponds to a case of one hop, and when one DU 702 exists between the DU 701 and RU 711 as shown in FIG. 7B, it corresponds to a case of 2 hops. Therefore, if the number of relaying DUs increases by one, the number of hops also increases by one. Accordingly, the DU processing delay 802 also increases. That is, it can be seen that the DU processing delay 802 increases in proportion to the number of hops.

In the cases of multi-hop in which downlink data is transmitted to the RU via a plurality of DUs, including the case of FIG. 7B, the DU processing delay 802 may increase by the number of hops.

Actually, as the number of hops increases, the fronthaul delay 803 may also increase. However, since the fronthaul itself is configured using the optical transmission scheme as described above, the increase in the fronthaul delay may be negligible. If the fronthaul delay is also accurately considered, the fronthaul delay may be considered based on the number of hops.

Next, when inter-gNB cooperation is performed, as illustrated in FIG. 7C, the DUs 701 and 703 included in different base stations may transmit data between the DUs 701 and 703 based on the inter-gNB cooperation. The time according to the inter-gNB cooperation delay 801 may vary depending on an interface scheme between DUs. That is, as described above, the delay time may vary depending on the case in which a direct interface exists between DUs and the case in which a CU should be passed through. The delay time in the case illustrated in FIG. 7C may be calculated as a sum of the inter-gNB cooperation delay 801, DU processing delay 808, fronthaul delay 803, and RU processing delay 804.

Therefore, among the delay times of FIGS. 7A to 7C, the direct type connection of FIG. 7A has the shortest time. In the relay-type connection of FIG. 7B, a delay time may be added according to the number of hops. In the case of FIG. 7C having the inter-gNB cooperation delay may have the longest transmission processing time.

The transmission processing times or transmission processing delay times based on FIGS. 7A to 7C may be changed according to the connection between the DU and the RU, that is, the configuration of the DU and the RU. However, since the dual access scheme proposed in the present disclosure uses a direct connection configuration, transmission processing time can be minimized. This shortening of the transmission processing time will be evaluated as a method suitable for low-latency transmission for services such as the XR services described above.

3. Handover within a Dual Access TRP 3.1. Master DU and Secondary DU

Figure 9:
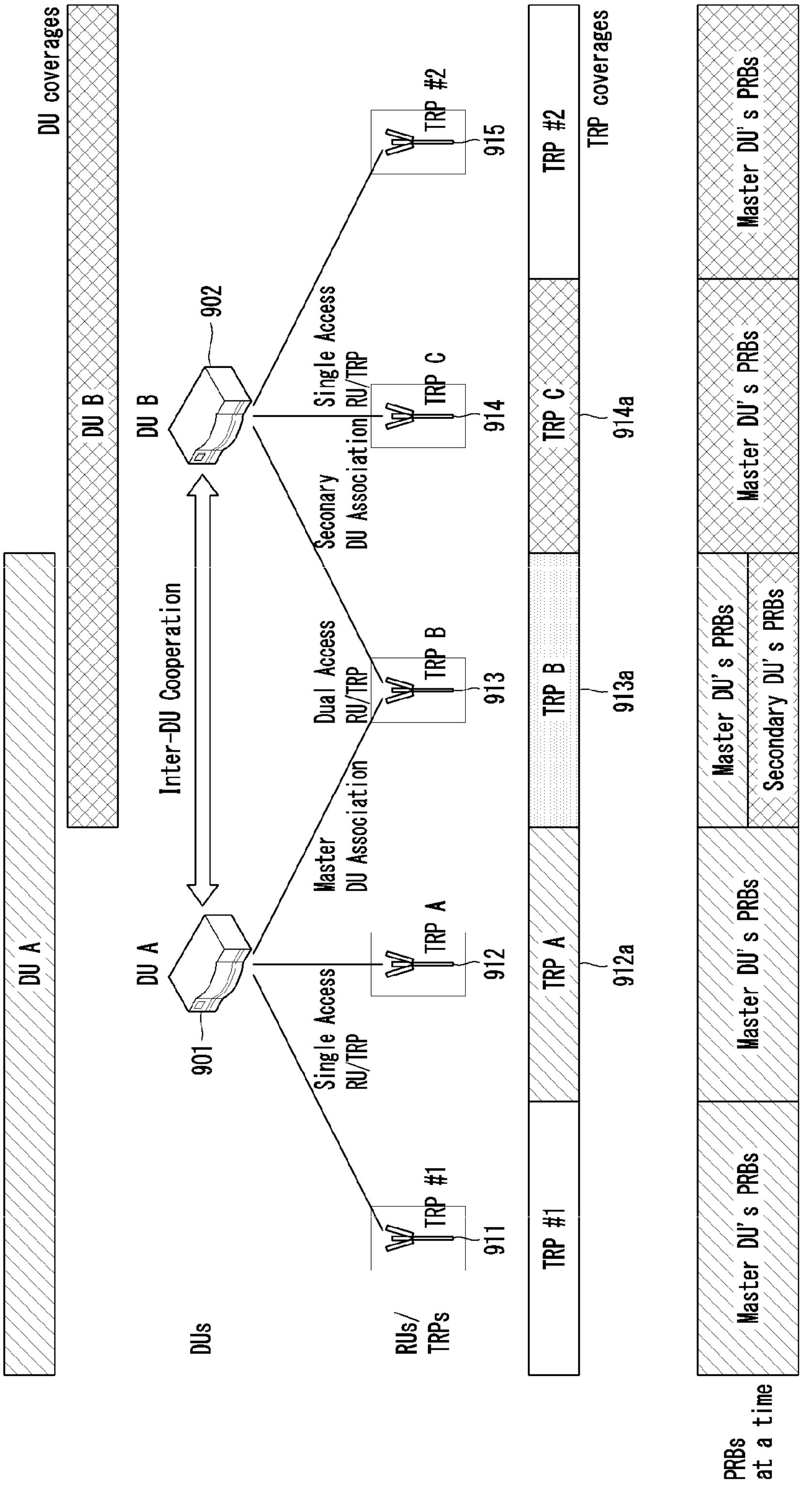
FIG. 9 is an exemplary diagram of configuring a network with dual access TRPs according to an exemplary embodiment of the present disclosure.

FIG. 9 is an exemplary diagram of configuring a network with dual access TRPs according to an exemplary embodiment of the present disclosure.

Referring to FIG. 9, a DU A 901 and a DU B 902 are shown, and the DU A and the DU B may be included in one base station or may be included in different base stations. Three TRPs 911, 912, and 913 may be connected under the DU A 901. Also, three TRPs 913, 914, and 915 may be connected under the DU B 902.

Each of the TRPs 911, 912, 913, 914, and 915 may have a TRP coverage based on a distance that a radio signal can reach. In FIG. 9, a coverage of the TRP #1 911 and a coverage of the TRP #2 912 are not illustrated, and only a coverage 912*a* of the TRP A 912, a coverage 913*a* of the TRP B 913, and a coverage 914*a* of the TRP C 914 are illustrated.

As illustrated in FIG. 9, the TRP coverages 912*a*, 913*a*, and 914*a* are configured up to the locations where the radio signals transmitted from the TRPs arrive, and when the terminal is located between the two TRPs, if the same radio resource is used by each TRP to transmit the same data, an effect of combining signals may be obtained. When different TRPs transmit the same data through the same radio resource in this manner, the quality of the signal at the terminal is improved, and when different TRPs transmit different data through the same radio resource, they act as a mutual interference signal, and thus the quality of the signal at the terminal may degrade.

Here, the TRP B 913 may be a dual access TRP and may be connected to one master DU 901 and one or more secondary DUs 902. In this case, the TRP B 913, which is a dual access TRP, may configure a master DU association with the master DU 901 and a secondary DU association with the secondary DU 902.

In this case, each of the master DU 901 and the secondary DU 902 may exclusively use physical resource block(s) (PRB(s)), which are radio resources. At a specific time, a DU to which PRB(s), which are frequency domain radio resources, are allocated may be determined. The dual access TRP 913 may integrate resources managed by the master DU 901 and resources managed by the secondary DU 902, and may transmit and receive radio signals in PRBs in the frequency domain.

PRBs used between the DUs may change over time based on information shared therebetween. A management authority for the PRBs may be operated fixedly for a specific time. The management authority for the PRBs during a specific time unit may be determined by agreement between the DUs, and a specific DU may manage the PRBs during the specific time unit. The specific time unit may be configured as a minimum time unit of radio resources. For example, the time unit may be a symbol unit, a slot unit, or a frame unit.

The dual access TRP 913 may generate and transmit radio signals based on data received from the master DU 901 and the secondary DU 902 in a downlink direction, and may provide data obtained from radio signals received in an uplink direction to all or some of the master DU 901 and secondary DU 902.

The dual access TRP 913 may generate radio signals based on data received from the master DU 901 and the secondary DU 902 and transmit the radio signals in a downlink direction through resources to which the PRB(s) managed by the master DU 901 and the PRB(s) managed by the secondary DU 902 are integrated. The dual access TRP may transmit the generated radio signals to a terminal.

The dual access TRP 913 may receive radio signals transmitted by a terminal in an uplink direction through the resources to which the PRB(s) managed by the master DU 901 and the PRB(s) managed by the secondary DU 902 are integrated, and deliver data obtained from the received radio signals to the master DU 901 and the secondary DU 902. Each DU may separate data corresponding to the PRB(s) itself manages from the data received from the dual access TRP 913. Alternatively, the dual access TRP 913 may obtain data by receiving the radio signals transmitted by the terminal in the uplink direction and separate data corresponding to the PRB(s) managed by each DU. That is, the dual access TRP 913 may deliver data separated for each DU to the corresponding DU.

Figure 10:
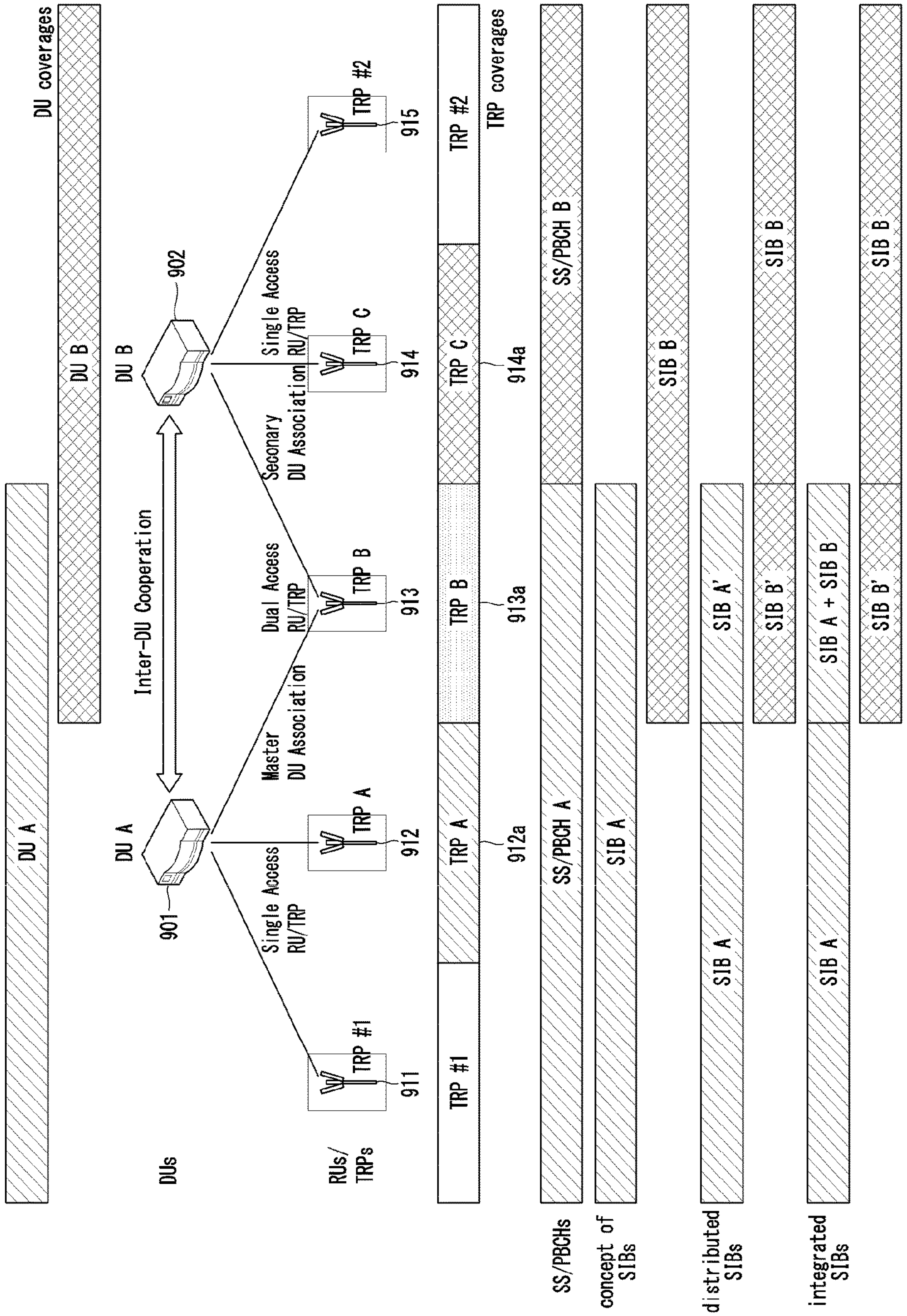
FIG. 10 is an exemplary diagram illustrating SS/PBCH transmission coverages and SIB transmission coverages according to an exemplary embodiment of the present disclosure.

FIG. 10 is an exemplary diagram illustrating SS/PBCH transmission coverages and SIB transmission coverages according to an exemplary embodiment of the present disclosure.

3.2. Synchronization Signal/Physical Broadcast Channel (SS/PBCH)

Since an SS/PBCH includes information for each base station (or CU), TRPs connected to the same DU may transmit the same SS/PBCH. Each TRP may repeatedly transmit the same SS/PBCH at a predetermined time periodicity. The terminal may repeatedly receive the SS/PBCH and obtain information of the SS/PBCH using the received SS/PBCHs.

In general, the SS/PBCH may include a cell identifier and a master information block (MIB) of a broadcast channel (BCH). The MIB may include information on a resource through which a system information block (SIB) is transmitted. The SS/PBCH may be associated with a base station including the master DU 901. The SIB transmitted in the resource obtained from the MIB may be associated with the master DU 901.

In FIG. 10, the dual access TRP 913 may transmit an SS/PBCH A in a TRP B coverage. The SS/PBCH A may include information on a resource through which an SIB A is transmitted.

3.3. SIB

In general, an SIB may be transmitted for each TRP. In general, a TRP may transmit an SIB through a resource indicated by the SS/PBCH (i.e. MIB of the SS/PBCH), and the SIB may include information on the base station associated with the master DU. The dual access TRP may transmit both an SIB associated with the master DU and an SIB associated with the secondary DU. In this case, the dual access TRP may transmit the SIB(s) in one of the following schemes.

Master DU-led SIB transmission: The dual access TRP 913 may receive both the SIB associated with the master DU 901 and the SIB associated with the secondary DU 902 from the master DU. The master DU 901 may obtain the SIB generated by the secondary DU 902 through a signal exchange procedure with the secondary DU 902, and deliver it to the dual access TRP 913. All the SIBs (i.e. the SIB associated with the master DU and the SIB associated with the secondary DU) may be transmitted in radio resources managed by the master DU 901.

SSB transmission by secondary DU: The dual access TRP may receive the SIB associated with the master DU from the master DU and the SIB associated with the secondary DU from the secondary DU. Each SIB may be transmitted in radio resources managed by the DU with which the corresponding SIB is associated.

Radio resource allocation for SIB B by SIB A: Allocation information of a radio resource through which the SIB (e.g. SIB B) associated with the secondary DU 902 is received may be obtained from the SIB (e.g. SIB A) associated with the master DU 901. The terminal may receive the SS/PBCH transmitted by the dual access TRP 913 in a coverage of the dual access TRP 913, and identify allocation information of a radio resource through which the SIB (i.e. SIB A) associated with the master DU 901 is transmitted, which is included in the SS/PBCH. Then, the terminal may identify from the SIB A the allocation information of the radio resource through which the SIB (i.e. SIB B) associated with the secondary DU 902 is transmitted. Thereafter, the terminal may receive the SIB (i.e. SIB B) associated with the secondary DU. The radio resource through which the SIB B transmitted by the dual access TRP 913 is transmitted may be different from a radio resource through which the SIB B transmitted by a neighbor TRP (e.g. TRP 914) is transmitted.

Utilization of persistent SIB B radio resources: The dual access TRP 913 transmitting the SIB (e.g. SIB B) associated with the secondary DU 902 and the neighbor TRP (e.g. TRP 914) may transmit the SIB B in the same radio resources. The terminal having received the SIB B from the neighbor TRP (e.g. 914) may receive the SIB B using information on a radio resource in which the SIB B has been received. In addition, the dual access TRP 913 may transmit the SIB B by using the same radio resource that has been used by the neighbor TRP (e.g. 914) to transmit the SIB B.

SIB A includes information of SIB B: In the scheme of 'Master DU-led SIB transmission', the master DU 901 may receive the SIB (e.g. SIB B) from the secondary DU 902 and include contents of the SIB (e.g. SIB B) received from the secondary DU in the SIB (e.g. SIB A) associated with the master DU. The dual access TRP 913 may transmit an SIB (i.e. SIB A+SIB B) that includes both the contents of the SIB (i.e. SIB A) associated with the master DU 901 and the contents of the SIB (i.e. SIB B) associated with the secondary DU 902 in the radio resources of the master DU. Additionally, the dual access TRP 913 may transmit the SIB (i.e. SIB B) associated with the secondary DU through the radio resources of the secondary DU 902.

Transmission of information on difference between SSBs: The dual access TRP 913 may transmit information on a difference between the contents of the SIB (i.e. SIB A) associated with the master DU 901 and the contents of the SIB (i.e. SIB B) associated with the secondary DU 902 in the radio resources of the master DU 901. Common information between the contents of the SIB (i.e. SIB A) associated with the master DU and the contents of the SIB (i.e. SIB B) associated with the secondary DU may be transmitted through the radio resources of the master DU as being included only in an SIB associated with the master DU 901. The information on the difference between the contents of the SIB associated with the master DU and the contents of the SIB associated with the secondary DU may be transmitted through the radio resources of the secondary DU as being included only in an SIB associated with the secondary DU 902.

Hereinafter, a specific example of utilizing SIBs will be described with reference to FIG. 10.

The TRP B 913, which is a dual access TRP, may configure a master DU association with a DU A 901 and a secondary DU association with a DU B 902. Since the dual access TRP 913 configures the master DU association with the DU A 901, it may configure and transmit an SS/PBCH A related to the DU A 901.

The dual access TRP 913 may need to be included in both a coverage of the DU A 901 and a coverage of the DU B 902, and may need to be able to transmit both the SIB A and the SIB B. The SS/PBCH A may include radio resource information allocating a radio resource of the SIB A. The terminal may receive the SS/PBCH A, obtain the radio resource of the SIB A, and receive the SIB A in the radio resource.

Scheme of configuring SIBs in a distributed manner (distributed SIB scheme): The SIB A may include radio resource information allocating a radio resource of the SIB B. The SIB A, which includes radio resource information allocating the radio resource of the SIB B, may be referred to as 'SIB A". The terminal may receive the SIB A', obtain radio resource information allocating the radio resource of the SIB B from the SIB A', and receive the SIB B through the radio resource of the SIB B.

Scheme of configuring SIBs in an integrated manner (integrated SIB scheme): The SIB A and the SIB B may be transmitted together in radio resources managed by the DU A which is the master DU. The terminal may receive both the SIB A and the SIB B after receiving the SS/PBCH A.

The integrated SIB scheme and the distributed SIB scheme may be operated together. In FIG. 10, an example is provided in which SIBs are configured in the integrated scheme, the SIB A and the SIB B are transmitted in the radio resources managed by the DU A (i.e. master DU) and the SIB B is transmitted in the radio resources managed by the DU B (i.e. secondary DU). The terminal may receive the SIB B after receiving the SS/PBCH A from the dual access TRP 913.

Meanwhile, the terminal that receives the SIB B from the TRP C 914 and moves to the TRP B 913 may receive the SIB B from the TRP B 913. When SIBs are configured in the distributed scheme, the terminal may receive the SS/PBCH A from the coverage of the TRP B 913, receive the SIB A in a resource indicated by the SS/PBCH A, and receive the SIB B in a resource indicated by the SIB A. Alternatively, the terminal may receive the SIB B using the same allocation information of the radio resource of the SIB B that has been received from the TRP C 914.

When the SIBs are configured in the integrated scheme, the terminal that moves from the TRP C 914 to the TRP B 913 may receive the SS/PBCH A from the TRP B 913 and receive the SIB B in a resource indicated by the SS/PBCH A. The terminal located in the TRP B may receive both the SIB A and the SIB B.

3.3.1. DU Selection Information (Terminal Selection Support)

A terminal located in a coverage of a dual access TRP may select PRB(s) from among PRB(s) of a master DU and PRB(s) of a secondary DU. To this end, information (i.e., DU selection information) regarding a condition for selecting the PRB(s) of the master DU and a condition for selecting the PRB(s) of the secondary DU may be transmitted as being included in the SIB. If information on the above-described conditions is not included in the SIB or the terminal does not satisfy any of the above-described conditions, the terminal may use the PRB(s) of the master DU.

The terminal may receive the SIB associated with the master DU based on the SS/PBCH. The terminal may obtain the DU selection information from the received SIB and select a DU according to the condition(s) indicated by the DU selection information. The terminal may use PRB(s) managed by the selected DU.

3.3.2. Intra-Base Station SIB Configuration

The base station may be composed of DU(s) and RU(s)/TRP(s). Since a single access TRP is associated with one DU, SIBs may be configured to reflect the one DU.

3.3.3. Inter-Base Station SIB Configuration

The base station may be composed of DU(s) and RU(s)/TRP(s). Since a dual access TRP is associated with two DUs (i.e. master DU and secondary DU), SIBs may be configured to reflect the two DUs.

3.3.4. Network Information SIB Configuration

A radio environment may be construction by connecting a base station to another network. SIBs may be configured to include configuration information of neighbor networks.

3.4. Initial Access Procedure

The terminal may perform a process of searching for a TRP with a good radio channel and use information on the TRP obtained through the process to proceed with an initial access procedure.

3.4.1. Beam Search

Beam search: A DU that manages radio resources may configure a service coverage of the base station by using multiple TRPs. A beam search procedure may be used to identify the multiple TRPs within the DU. The base station may operate the TRPs by assigning one or more beams to each TRP. The base station may transmit radio signals by allocating a time/space resource to each beam. The radio signal may be a radio signal including the SS/PBCH. The terminal may identify a TRP of a coverage where the terminal is located by identifying a beam received through the beam search procedure. The terminal may identify the TRP based on a radio resource in which the radio signal is received. The terminal may transmit information on preferred beam(s) identified through the beam search procedure to the base station.

TRP identification using beam search history: The number of beams operated by multiple TRPs may be less than the number of beams that the base station can use. The base station may activate multiple spatially differentiated beams in a radio resource that identifies a specific beam, and utilize the beams for beam search. The terminal may identify a TRP by simultaneously using information on a beam having a good channel and information on neighbor beams. Alternatively, the terminal may transmit information on the beams to the base station, and the base station may identify the TRP where the terminal is located. For example, when information on four beams is used, even if a beam 1 is indicated as a preferred beam, if the next priority beams are different, the TRP where the terminal is located may be identified differently depending on the next priority beams.

Neighbor beam search information: Information on the preferred beam and information on the next priority beams may be obtained in the beam search procedure. In the beam search procedure, the terminal may store information obtained at each search opportunity and give a priority to each beam according to a received signal strength of each beam. The terminal may identify information (e.g. identifier) of a beam from information of a radio resource in which the beam is received. The terminal may transmit information on lower priority beams along with information on the most preferred (e.g. highest priority) beam to the base station. The terminal may transmit information on the beams acquired in the beam search procedure according to a range and scheme requested by the base station.

Meanwhile, the terminal may performs an initial access procedure (3.4.2) to the master DU using the preferred beam selected through the beam search procedure, or may perform an initial access procedure (3.4.3) by selecting the master DU or secondary DU in the beam search procedure.

3.4.2. Initial Access Procedure to the Master DU

Random access to the master DU: The terminal may attempt an initial access procedure including a random access procedure using the most preferred beam space. The base station that receives a random access message (i.e. random access preamble) may transmit a random access response through all beams using the same beam space. If a TRP has not yet been identified, a specific beam included in the TRP cannot be specified.

Beam search result reporting: The terminal may report information on the received beam(s) to the base station as a result of the beam search procedure. In case of a single access TRP, the TRP is connected to one DU, so the process of selecting a DU is not necessary. In case of a dual access TRP, the terminal may transmit information on the received beam(s) to the connected master DU.

Initial message transmission to master DU: The terminal may transmit a beam search history by transmitting an initial message after random access to the base station including the master DU. The base station receiving the beam search history may use the received beam search history to identify a TRP where the terminal is located. The base station may transmit a response message to the initial message through a beam of the identified TRP.

DU selection by base station: The base station may select the master DU or secondary DU using the location of the terminal specified by the beam within the TRP. The base station may transmit information on the selected DU to the terminal by including it in the response message. The terminal receiving the information on the selected DU may proceed with the access procedure using resources managed by the selected DU. If the master DU is selected according to the information on the selected DU, the terminal may not need to change the DU. If the secondary DU is selected according to the information on the selected DU, the terminal may proceed with the initial access procedure using the PRB(s) managed by the secondary DU.

3.4.3. Initial Access Procedure to a DU Selected by Terminal

Provision of DU selection condition(s) through SIB: The base station may transmit information on condition(s) for the terminal to select a DU in the beam search procedure by including it in the SIB. For example, DU selection condition (s) may be provided for selecting a DU using radio information including the most preferred beam and the beam search history.

DU selection by terminal: The terminal may select a DU that is a target of the initial access procedure using the beam search result and the provided DU selection condition(s). The terminal may select a DU that satisfies the DU selection condition(s). If there is no DU that satisfies the DU selection condition(s), the terminal may select the master DU, select an arbitrary DU, or select a fixedly-predetermined DU.

Use of PRB(s) of selected DU: The terminal may proceed with the initial access procedure using PRB(s) managed by the selected DU. The terminal may proceed with the initial access procedure, including a random access procedure, with the selected DU.

TRP identification using beam search history: The number of beams operated by multiple TRPs may be less than the number of beams that the base station can use. The base station may activate multiple spatially differentiated beams in a radio resource that identifies a specific beam, and utilize the beams for beam search. The terminal may identify a TRP by simultaneously using information on a beam having a good channel and information on neighbor beams.

Provision of TRP information in random access: The terminal may provide information on a TRP of a coverage in which it is located using a code (e.g. preamble) used in the random access procedure. The base station may configure random access codes as many as the number of TRPs operated by the base station, and provide information on the configured random access codes to the terminal through the SIB. The terminal may transmit a random access code corresponding to the identified TRP to the base station in the random access process, and the base station may identify the TRP through the random access code. The base station may transmit a random access response message to the terminal through the identified TRP and a beam of the identified TRP.

Provision of TRP information using a message: If the random access procedure does not include the procedure for identifying the TRP (i.e. procedure for the terminal to provide TRP information), the terminal may provide the base station with information on the TRP of the coverage where it is located through a message. In procedures before information on the TRP of the coverage where the terminal is located is provided, radio resources through which the terminal's radio signals are transmitted and radio resources through which the base station's radio signals are transmitted may be equally allocated to all TRPs sharing beams. The base station receiving the TRP information may transmit a random access response message to the terminal through the identified TRP and a beam of the identified TRP.

3.4.4. Message Access Procedure

After the information on the selected is shared between the terminal and the base station, messages for the initial access procedure may be exchanged.

3.5. Handover Procedure

When the terminal moves across a boundary of TRP coverages, a TRP coverage switching procedure (3.5.2) within the same DU may be performed. Alternatively, the terminal may proceed with a DU coverage switching procedure (3.5.3) within the dual access TRP.

3.5.1. Neighbor TRP Search

The terminal may periodically perform a beam search procedure while moving. The base station may provide beam coverages for the terminal to search for beams, and allocate per-beam resources to each beam coverage. The base station may transmit a beam for each beam coverage resource, and the terminal may search for a beam by obtaining information on a beam coverage resource for a location where the terminal receives the beam. In the beam search procedure, the terminal may search for beams through reception of SS/PBCHs provided by the current TRP.

In the beam search procedure, the terminal may simultaneously search for beams of neighbor TRPs by proceeding with the process of receiving neighbor SS/PBCHs from radio signals received through the respective beam coverage resources. The terminal may identify information (e.g. identifier) of a beam based on a beam coverage resource in which the beam is received, and determine a TRP based on the information of the beam.

3.5.2. TRP Coverage Switching within the Same DU

When the terminal moves across TRP coverages, the terminal may proceed with a procedure to search for neighbor TRP. In the procedure for searching for neighbor TRPs, the terminal may determine a candidate TRP (i.e. target TRP) that is a target of handover.

Neighbor TRP information reporting, request of switching to target TRP: Although a change of a TRP coverage is detected, it may be identified that a serving TRP and a target TRP are included in the same DU (e.g. identified based on SIBs received from the serving TRP and the target TRP). The terminal may obtain a beam identifier from information on a radio resource of the changed beam and report the beam identifier to the serving TRP (i.e. transmission of a neighbor TRP information report message). The transmission of the beam identifier may mean requesting TRP switching to the target TRP. The neighbor TRP information report message may include the beam identifier of the target TRP or a radio resource identifier of the searched coverage, and may additionally include information such as a signal strength of the received beam. The serving TRP may deliver the received neighbor TRP information report message to the DU.

TRP switching command: The DU may determine TRP switching based on the neighbor TRP information report message received from the serving TRP. To start the procedure of switching the serving TRP for the terminal from the current serving TRP to the target TRP, the DU may transmit a TRP switching command to the terminal via the serving TRP. The terminal may receive the TRP switching command from the DU, change its serving TRP from the current serving TRP to the target TRP, and change a serving beam to a beam associated with the target TRP.

Random access to the target TRP: The terminal may start an access procedure to the target TRP through a random access procedure in radio resources allocated to the target TRP. If a radius of the target TRP coverage is narrow, the terminal may skip the random access procedure to the target TRP and start a TRP switching completion procedure.

TRP switching completion: The terminal may transmit a TRP switching complete message in the radio resource allocated to the target TRP. The terminal may connect to the target TRP and use the target TRP as a serving TRP according to the transmission of the TRP switching complete message.

TRP switching acknowledgement: To confirm that the terminal's TRP switching procedure has been completed, the DU may transmit a TRP switching acknowledgment message to the terminal. The DU may confirm that the terminal's TRP switching procedure has been completed by transmitting data to the terminal without transmitting the TRP switching acknowledgement message. The terminal receiving the TRP switching acknowledgement message or data from the DU may recognize that the TRP coverage switching procedure within the DU has been completed.

3.5.3. DU Coverage Switching within a Dual Access TRP

The terminal may perform a beam search procedure while moving within a dual access TRP, and perform a procedure for DU switching according to a beam change. The DU switching may require a change in a protocol including MAC layer, etc. that performs scheduling. The change in the protocol may require an RRC reconfiguration procedure between the base station and the terminal.

Beam search result reporting to DU: The terminal that detects a beam change within the dual access TRP may report a beam search result (including information on a target DU) to a current serving DU. An operation of determining DU switching based on the beam search result reported by the terminal may be performed in the DU or CU. If the serving DU determines DU switching, the serving DU may transmit information indicating that it has determined DU switching to the CU. Meanwhile, the serving DU may be a master DU connected to the dual access TRP, and the target DU may be a secondary DU connected to the dual access TRP. Alternatively, the serving DU may be a secondary DU connected to the dual access TRP and the target DU may be a master DU connected to the dual access TRP.

CU determining DU switching and indicating DU switching: The CU that receives the beam search result from the terminal or the information on the DU switching determined by the serving DU may determine the DU switching. Thereafter, the CU may transmit a DU switching command message (i.e. command message indicating DU switching) to the terminal. The DU switching command message transmitted from the CU to the terminal may be an RRC reconfiguration message. The DU switching command message transmitted from the CU to the terminal may be transmitted in radio resources managed by the serving DU. The CU may indicate the serving DU and the target DU to perform procedures for the DU switching.

Completion of DU switching by terminal: The terminal receiving the DU switching command message from the CU may perform an access procedure to the target DU in radio resources managed by the target DU. The terminal may transmit a DU switching complete message to the CU in radio resources managed by the target DU. The DU switching complete message transmitted from the terminal to the CU may be an RRC reconfiguration complete message.

Confirmation of DU switching by terminal: The CU may transmit to the terminal an acknowledgement message (e.g. radio link control (RLC) ACK) for the DU switching complete message transmitted by the terminal. The terminal receiving the acknowledgement message (e.g. RLC ACK) may confirm that the DU switching has been completed.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner. The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A handover method of a terminal, comprising:

detecting a beam change within a dual access transmission and reception point (TRP) through a beam search procedure;

reporting a beam search result indicating the beam change to a current serving distributed unit (DU) through the dual access TRP;

receiving, from a central unit (CU) to which the terminal is connected and through the dual access TRP, a command message indicating DU switching for switching a serving TRP of the terminal from the current serving DU to a target DU; and performing an access procedure to the target DU, wherein the current serving DU is a master DU connected to the dual access TRP and the target DU is a secondary DU connected to the dual access TRP, or the current serving DU is a secondary DU connected to the dual access TRP and the target DU is a master DU connected to the dual access TRP.

2. The handover method according to claim 1, wherein the DU switching is determined and notified by the current serving DU to the CU, or determined by the CU based on a beam search result from the terminal.

3. The handover method according to claim 1, wherein radio resources managed by the current serving DU are mutually exclusive from radio resources managed by the target DU.

4. The handover method according to claim 3, wherein the command message indicating the DU switching is a radio resource control (RRC) reconfiguration message.

5. The handover method according to claim 4, wherein the command message indicating the DU switching is transmitted through radio resources managed by the current serving DU.

6. The handover method according to claim 3, wherein the access procedure to the target DU is performed through radio resources managed by the target DU.

7. The handover method according to claim 2, further comprising:

transmitting a DU switching complete message to the CU; and receiving, from the CU, an acknowledgment message for the DU switching complete message transmitted by the terminal.

8. The handover method according to claim 7, wherein the DU switching complete message and the acknowledgement message are transmitted and received through radio resources managed by the current serving DU, the DU switching complete message is an RRC reconfiguration complete message, and the acknowledgement message is a radio link control (RLC) acknowledgement (ACK) message.

9. The handover method according to claim 1, further comprising:

receiving, from the dual access TRP, a synchronization signal/physical broadcast channel (SS/PBCH) of the CU, system information block (SIB) associated with the current serving DU, and SIB associated with the target DU.

10. The handover method according to claim 1, further comprising:

receiving a master information block (MIB) from the master DU connected to the dual access TRP through the dual access TRP; and receiving, through the dual access TRP, a first system information block (SIB) of the master DU and a second SIB of a first secondary DU connected to the dual access TRP, wherein the master DU and at least one secondary DU including the first secondary DU belong to a same central unit (CU) or different CUs, and different radio resources are allocated to the master CU and the first secondary DU.

11. The handover method according to claim 10, wherein the MIB includes information on resources for reception of the first SIB and is received through radio resources allocated to the master DU.

12. The handover method according to claim 10, wherein the first SIB includes information related to reception of the second SIB.

13. The handover method according to claim 12, wherein the first SIB includes information on resources for reception of the second SIB.

14. The handover method according to claim 12, wherein at least a portion of the second SIB is received as being included in the first SIB.

15. The handover method according to claim 10, wherein common information of the first SIB and the second SIB is received through resources allocated to the master DU, and information on a difference between the first SIB and the second SIB is received through resources allocated to the first secondary DU.

* * * * *